US012160938B2

(12) United States Patent
Ray et al.

(10) Patent No.: US 12,160,938 B2
(45) **Date of Patent: *Dec. 3, 2024**

(54) HYBRID LIGHT EMITTING DIODE TUBE WITH POWER SELECT SWITCH

(71) Applicant: LEDVANCE LLC, Wilmington, MA (US)

(72) Inventors: Soumya Kanta Ray, Methuen, MA (US); Anil Jeswani, Acton, MA (US)

(73) Assignee: LEDVANCE LLC, Wilmington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/601,281

(22) Filed: Mar. 11, 2024

(65) Prior Publication Data

US 2024/0224391 A1 Jul. 4, 2024

Related U.S. Application Data

(63) Continuation of application No. 17/959,558, filed on Oct. 4, 2022, now Pat. No. 11,937,348, which is a continuation of application No. 17/221,381, filed on Apr. 2, 2021, now Pat. No. 11,497,091.

(51) Int. Cl.

| | |
|---|---|
| ***H05B 45/10*** | (2020.01) |
| ***F21K 9/278*** | (2016.01) |
| ***F21S 4/28*** | (2016.01) |
| ***H05B 45/20*** | (2020.01) |
| *F21Y 103/10* | (2016.01) |
| *F21Y 115/10* | (2016.01) |

(52) U.S. Cl.

CPC ............. *H05B 45/10* (2020.01); *F21K 9/278* (2016.08); *F21S 4/28* (2016.01); *H05B 45/20* (2020.01); *F21Y 2103/10* (2016.08); *F21Y 2115/10* (2016.08)

(58) Field of Classification Search

None

See application file for complete search history.

(56) References Cited

U.S. PATENT DOCUMENTS 11,497,091 B2 * 11/2022 Ray ......................... F21V 23/04
11,937,348 B2 * 3/2024 Ray .................... H05B 45/3578

* cited by examiner

*Primary Examiner* — Anh Q Tran
(74) *Attorney, Agent, or Firm* — Harry Hild

(57) ABSTRACT

A lamp including a light source including at least one string of light emitting diodes (LEDs) within a tube body; end caps having contacts on each end of the tube body; driver electronics within the tube body including a filament detector portion provided by a passive resistance capacitor (RC) circuit that simulates the filament load of a fluorescent lamp when installed into a ballast containing fixture; and a power level selector switch in communication with the driver electronics for selecting the power level for powering the light source.

20 Claims, 12 Drawing Sheets

HYBRID LIGHT EMITTING DIODE TUBE WITH POWER SELECT SWITCH

CROSS REFERENCE TO RELATED APPLICATION

This patent application is a Continuation and claims benefit and priority to U.S. patent application Ser. No. 17/959,558 titled "HYBRID LIGHT EMITTING DIODE TUBE WITH POWER SELCT SWITCH" filed on Oct. 4, 2022, which claims benefit and priority to U.S. Pat. No. 11,497,091 titled "HYBRID LIGHT EMITTING DIODE TUBE WITH POWER SELECT SWITCH" filed on Apr. 2, 2021 and granted on Nov. 8, 2022, which is herein incorporated by reference in its entirety.

TECHNICAL FIELD

The present disclosure generally relates to lighting, and more particularly to lamp tubes used with light sources including light emitting diodes (LEDs).

BACKGROUND

Fluorescent light fixtures have been a popular form of lighting for many decades. A fluorescent lighting fixture includes one or more fluorescent tubes, with each tube having an end cap on each end of a tube. Lighting systems based on LED light sources are a fairly new technology in the lighting field. LED's are desirable because they have no mercury, and therefore, are more environment friendly. LED's also have a much longer lifetime, and use less power than fluorescent tubes of equivalent output.

SUMMARY

A hybrid light emitting diode tube lamp is provided that can be operated in a fixture for at least lamps, such as an Underwriters Laboratories Inc. (UL) Type A T8 lamp, a UL Type B T8 lamp, and a T12 lamp, and includes a mechanism for selecting the power level for powering the light source for the light emitted by the tube lamp. In some embodiments, by selecting the power level for powering the light source, the lumen intensity for the light may also be adjusted. In some embodiments, selecting the power level for powering the light source may be effectuated through a mechanical selector switch that is positioned on an exterior of the lamp. For example, the mechanical selector switch may be mounted on an exterior surface of an end cap for a tube type lamp, in which the exterior surface of the end cap provides that the switch is accessible when the tube lamp is positioned in the light fixture. As will be described herein, the switch for selecting the power level, e.g., referred to as a power level selector switch, for powering the light source may be accompanied by another separate switch for selecting lighting color characteristics, e.g., referred to as a light color selector switch, of light being emitted by the light source. For example, the power level selector switch may be present on a first end cap on a first end of the tube lamp, while the color selector switch may be present on a second end cap on a second end of the tube lamp, in which the first and second ends of the tube lamp are opposing ends of the tube lamp.

In one embodiment, the lamp includes a light source including at least one string of light emitting diodes within a tube body, and end caps having contacts on each end of the tube body. The lamp includes driver electronics including a filament detector portion provided by a passive resistance capacitor (RC) circuit that simulates the filament load of a fluorescent lamp when installed into a ballast containing fixture. The lamp further includes a power level selector switch for selecting the power level for powering the light source.

In another embodiment, the tube lamp is provided that may include a light source including at least one string of light emitting diodes within a tube body, and end caps having contacts with a G13 pin layout at each end of the tube body. The lamp may include driver electronics including a filament detector portion provided by a passive resistance capacitor (RC) circuit that simulates the filament load of a fluorescent lamp when installed into a ballast containing fixture for a T12 lamp or a Type A T8 lamp. The lamp further includes a power level selector switch for selecting light characteristics for light emitted by the light source the power level for powering the light source.

In yet another embodiment, the lamp may include a light source including at least one string of light emitting diodes present within a tube body, and end caps having contacts on each end of the tube body. The end caps of the lamp may further include a power level selector switch for selecting the power level for powering the light source.

BRIEF DESCRIPTION OF THE DRAWINGS

The following description will provide details of embodiments with reference to the following figures wherein.

DETAILED DESCRIPTION

Figure 1:
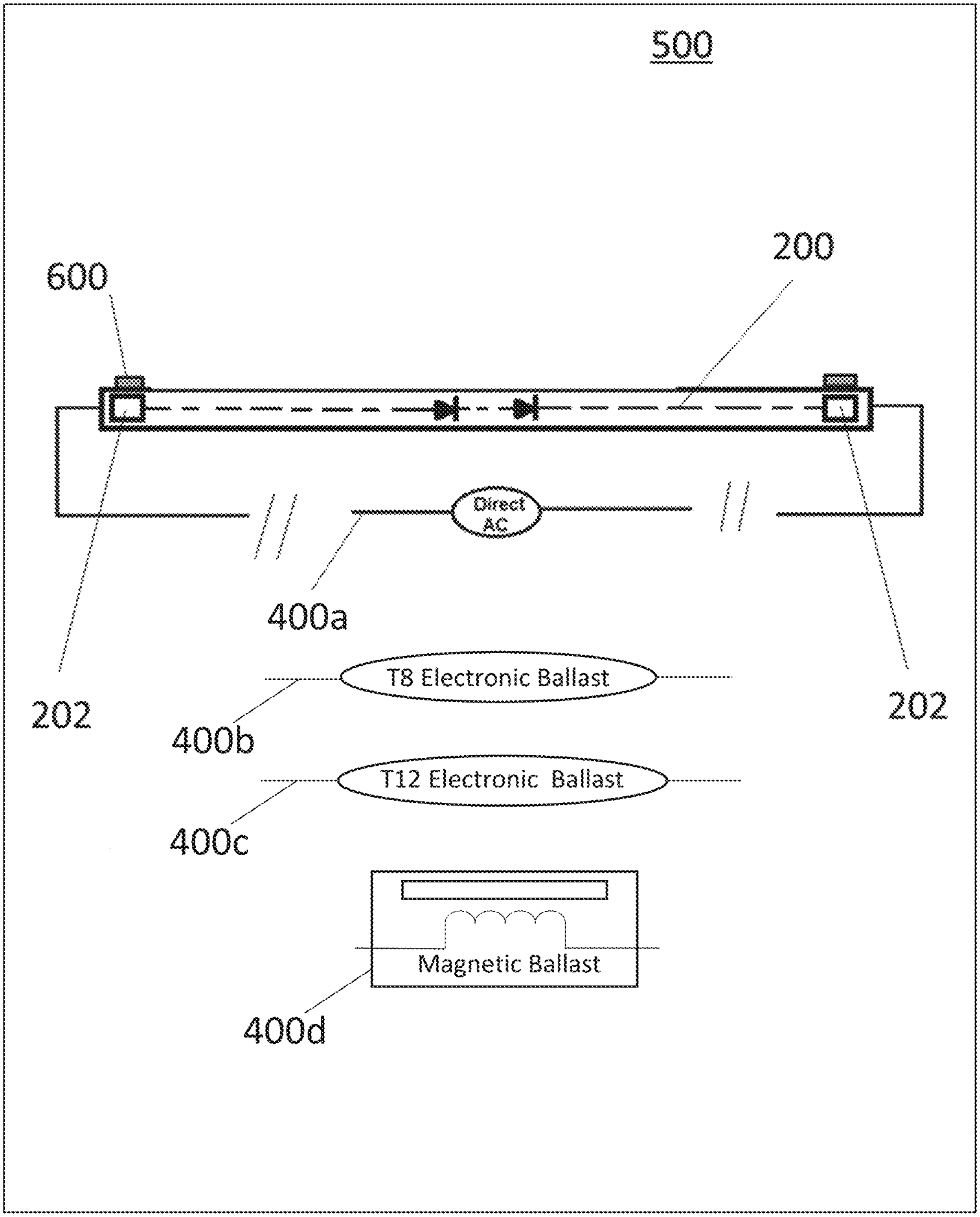
FIG. 1 is an illustration depicting one embodiment of a light emitting diode (LED) tube that is suitable for three lamps types, i.e., UL Type A T8 lamp, UL Type B T8 lamp and T12 lamp, in which the lamp further include a power level selector switch for selecting the power level for powering the light source.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

As light emitting diode (LED) light sources become a more attractive solution to lighting in fluorescent type lighting fixtures, glass and/or plastic tubes have been considered for light emitting diode (LED) lighting. There are a number of different types and standards for tube lights. Some examples of standards for tube lighting include UL Type A T8 lamp, UL Type B T8 lamp, and T12 that operate with magnetic and electronic ballast lamps. These types of tube lighting employ a G13 socket. The G13 pin type is a double pin design, in which the center to center distance between the two pins is 0.50 inches (12.7 mm), and the pin diameter is 0.093 inches (2.35 mm). In addition to T8 and T12 tube types, the G13 socket design is also suitable for T10 type tube lamps.

In some embodiments, the present disclosure provides a tube lamp with selectable power levels for powering the light source (also referred to as light engine), in which the selection of the different power levels may be made through a power level selector switch that is mounted to an exterior surface of the tube lamp. By mounting the power level selector switch to an exterior surface of the tube lamp, the structures described in the present disclosure allow for the user to easily adjust the power level of the tube lamp without removing any covers, hatches, doors etc. to an interior surface of the tube lamp. In some embodiments, by selecting the power level that energizes the light source, e.g., energizes the light emitting diodes (LED) of the light engine, selecting the power level can also select the lumen level of the light being emitted by the light engine. In some embodiments, the switch for selecting the power level for powering the light source of the lamp is fixed to a least one of the end caps of the tube lamp structure.

In some embodiments, in addition to a switch for selecting the power levels for powering the light source, the tube lamps described herein may incorporate additional controls for controlling the characteristics of lighting being emitted by the light source. For example, the tube lamp may also include selectable correlated color temperature (CCT) settings, in which the settings can be selected by color correlated temperature selection switch. In some embodiments, the switch for selecting the power level for powering the light source of the lamp, and the switch for selecting lighting characteristics to be emitted by the light source, such as the color correlated temperature (CCT), separate switches that are both fixed to a least one of the end caps of the tube lamp structure. In some embodiments, the switch for selecting the power level for powering the light source of the lamp, and the switch for selecting lighting characteristics to be emitted by the light source, such as the color correlated temperature (CCT), are each present on an end cap, and are positioned on opposing ends of the lamp tube.

In some examples, the methods and structures described herein can provide different power levels and different light color levels (CCTs) in a single tube lamp. In some embodiments, via selectable switch, a lighting designer can adapt the tube lamp to an application space by selecting appropriate power levels and color settings. As described herein, when referring to selecting a "power level", the current (and the power) to the light emitting diodes (LEDs) of the light source is adjusted, which may be through selecting a bias setting resistor corresponding to the selected power level. As noted, in some embodiments, by selecting the power level, the light emitted by the light emitting diodes (LEDs) of the light engine may also be adjusted for intensity, i.e., changes in lumen output. As described herein, in some embodiments, when referring to selecting a color correlated temperature (CCT) value, a string of light emitting diodes corresponding to the color selected may be illuminated, while other strings of light emitting diodes in the same light engine are not illuminated.

In some embodiments, the tube lamp that are described herein provide selectable light engine power levels and light color settings in a single tube lamp for both new construction and retrofit applications. In some examples, the tube lamp structures having selectable/switchable light engine power levels and light color settings that can include switchgear fixed to the end caps of the tube lamp offers good flexibility to a lighting designer or specifier for selecting either different light power levels (three light engine power levels of 16 Watt (W/)13 W/10 W) or 8 W/10 W/12 W; or the light colors (CCTs of 3000K/5000K/4000K). In some embodiments, the selector switches for selecting the different types of light engine power levels, e.g., lumen levels, and/or different types of light color, e.g., correlated color temperature (CCT) settings, are device mounted on a single unit. In some embodiments, the light designs of the present disclosure are suitable for 120-277V and/or 347V applications and can be 0-10V dimmable.

The structures provided herein provide a hybrid LED tube lamp for use with both T8 and/or T12 lamp sizes, or any other lamp size that employs a G13 socket. For example, the designs of the present disclosure provided herein allow an installer of the lamps to use the same LED tube to replace each of the following lamp types: 1) UL Type A T8 lamp, 2) UL Type B T8 lamp and/or 3) T12 magnetic and electronic ballast lamps. The structures described herein are scalable. For example, the lamp designs described herein can be adapted for either 2', 3', 4' or 8' lamp sizes.

Prior to the lamp designs of the present disclosure, depending on the ballast installed in the fixture, e.g., magnetic, high frequency or no ballast, the user had to acquire the specific lamp type design for the specific lamp fixture. For example, if the fixture in which the replacement lamp is to be installed already has high frequency (HF) ballast installed then the installer has to choose the Type A LED T8 Tube that is compatible with T8 HF ballast. In another example, if T12 magnetic ballast are installed in an application, the installer wishing to install a replacement lamp has to choose the LED T8 Lamp that is compatible with T12 magnetic ballast. In another example, if the lamp fixture in which the installer wants to replace lamp does not employ a ballast, i.e., a ballast free application, then Type B LED T8 tube lamps that use direct line voltage of 120V/277V and/or 347V can used.

Each of these 3 lamp types have different lamp designs (driver) to work with these specific ballasts.

The lamp designs described herein enables compatibility to these three types of lamps. i.e., 1) Type A T8 lamp, 2) Type B T8 lamp and/or 3) Type A T12 lamps that will work with magnetic and electronic ballast lamps, and offers a lot of flexibility to the installer of what type of replacement lamps can be employed in a fixture employing a G13 socket design, i.e., a socket design for accepting a G13 pin design. The lamp designs described herein have the following advantages: 1) the LED tube lamp of the present disclosure allows replacement of either T8 or T12 Florescent lamp types; T8 or T12 can be used in the same fixture as they both use the same G13 Lamp socket; 2) the LED tube lamp of the present disclosure does not need an external starter while operating with a magnetic ballast; 3) the LED tube lamp of the present disclosure allows flexibility to the installer by accommodating and enabling usage on 3 major installation conditions; and 4) the LED tube lamp of the present disclosure simplifies logistics, supply chain and minimizes inventory levels.

Further, as noted above, the tube lamp structure may include a switch for selecting the power level for powering the light source, e.g., light emitting diodes (LEDs) of the light source. The switch may be referred to as a power level selector switch. The power level select switch can be used to select the power level for illuminating the light emitting diodes (LEDs) of the light source of the tube lamp, wherein in one example the power level select switch may be used to select 1 value out of three option values for the power level for powering the light source that can be selected using the switch. It is noted that the switch can provides any number of optionally selected power levels, e.g., the switch can be used for selecting either two (2) or three (3) or four (4) or five (5) power level options. Having a power level select switch for selecting the power level for providing current (and power) to illuminate the light emitting diodes (LEDs) for the light source of the tube lamp can further simplify logistics, supply chain and minimizes inventory levels.

As will be described herein, in one example, a universal hybrid CCT select LED tube including integrated power level select switch is proposed that works to replace the following lamp types:

Type A T8 lamp that operates with compatible ballasts and drivers;

Type B T8 lamp that operates on a direct line voltage. e.g., 120/277V and/or 347V;

T12 lamp that operates with magnetic ballasts; and

T12 lamp that operates with traditional T12 electronic ballasts;

and includes a power level select switch for selecting the power level for illuminating the light emitting diodes (LEDs) of the light source of the tube lamp selected from the following options:

(A1) a first power level of 8 W;

(B1) a second power level of 10 W; and (C1) a third power level of 12 W.

or (A2) a first power level of 10 W;

(B2) a second power level of 13 W; and (C2) a third power level of 16 W.

In some embodiments, the universal hybrid CCT select LED tube further includes a color select switch for selecting the color correlated temperature (CCT) of the light source of the tube lamp selected from the following options:

(A3) a first color correlated temperature (CCT) of 3000K;

(B3) a second color correlated temperature (CCT) of 4000K (or 3500K); and (C3) a third color correlated temperature (CCT) of 5000K.

The methods and structures that are provided herein are now described with more detail with reference to FIGS. 1-12.

FIG. 1 depicts one embodiment of a light emitting diode (LED) tube lamp 500 that is suitable for a plurality of lamp fixture types. In some embodiments, the LED tube lamp 500 can be used or installed in any type of fixture that requires a Type-A LED T8 compatible ballast, such as a traditional T8 IS (instant start) ballast, or a T8 PS (programmable start)(collectively identified by reference number 400*b*); Type-B LED T8, which is ballast free or no ballast (direct AC)(identified by reference number 400*a*); T12 electronic ballasts (identified by reference number 400*c*) and magnetic ballast (identified by reference number 400*d*), such as T12 magnetic ballasts. Further, the LED tube lamp 500 is compatible in application as a replacement of traditional florescent lamp.

Referring to FIGS. 1-6, in some embodiments, to provide an LED tube lamp 500 for a retrofit application as a replacement of a florescent type lamp, the LED tube lamp 500 may include an LED driver 202 having a filament detection portion 702 for detecting the filament load suitable for being compatible with the aforementioned lamp fixture types, a power level selector switch 600 for selecting the power to power the light source of the lamp 500, a color selector switch 601 for selecting lighting characteristics of the lamp 500, and at least one string of light emitting diodes (LEDs) 201 for a light source. It is noted that in some embodiments, the color selector switch 601 may be omitted. In some embodiments, the filament detection portion 702 of the electronics package 700 includes a passive resistor-capacitor circuit (RC circuit) that simulates the filament load of the traditional florescent lamp.

Figure 2A:
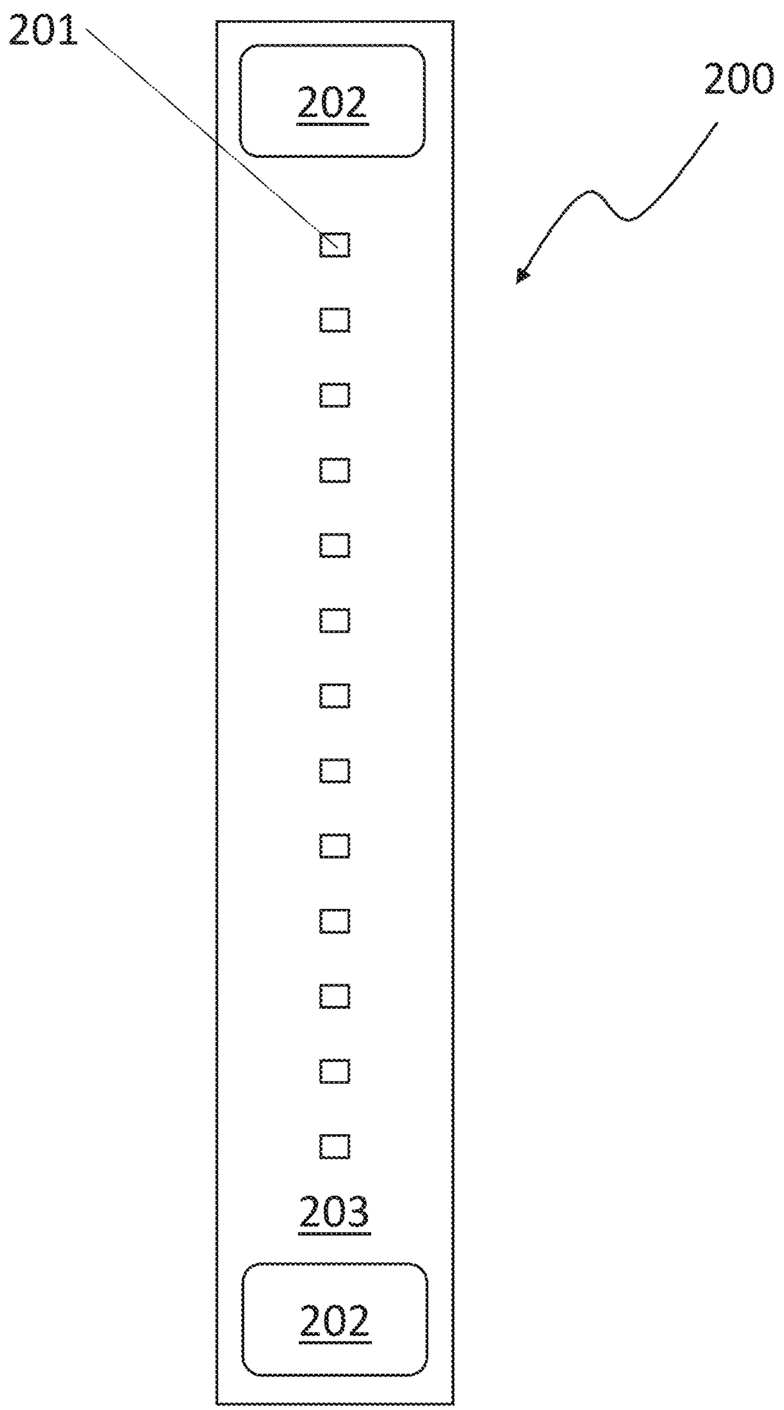
FIG. 2*a* is a top down view of a light source including a single string of light emitting diodes (LEDs) that may be used in a light emitting diode (LED) tube, in accordance with one embodiment of the present disclosure.
Figure 2B:
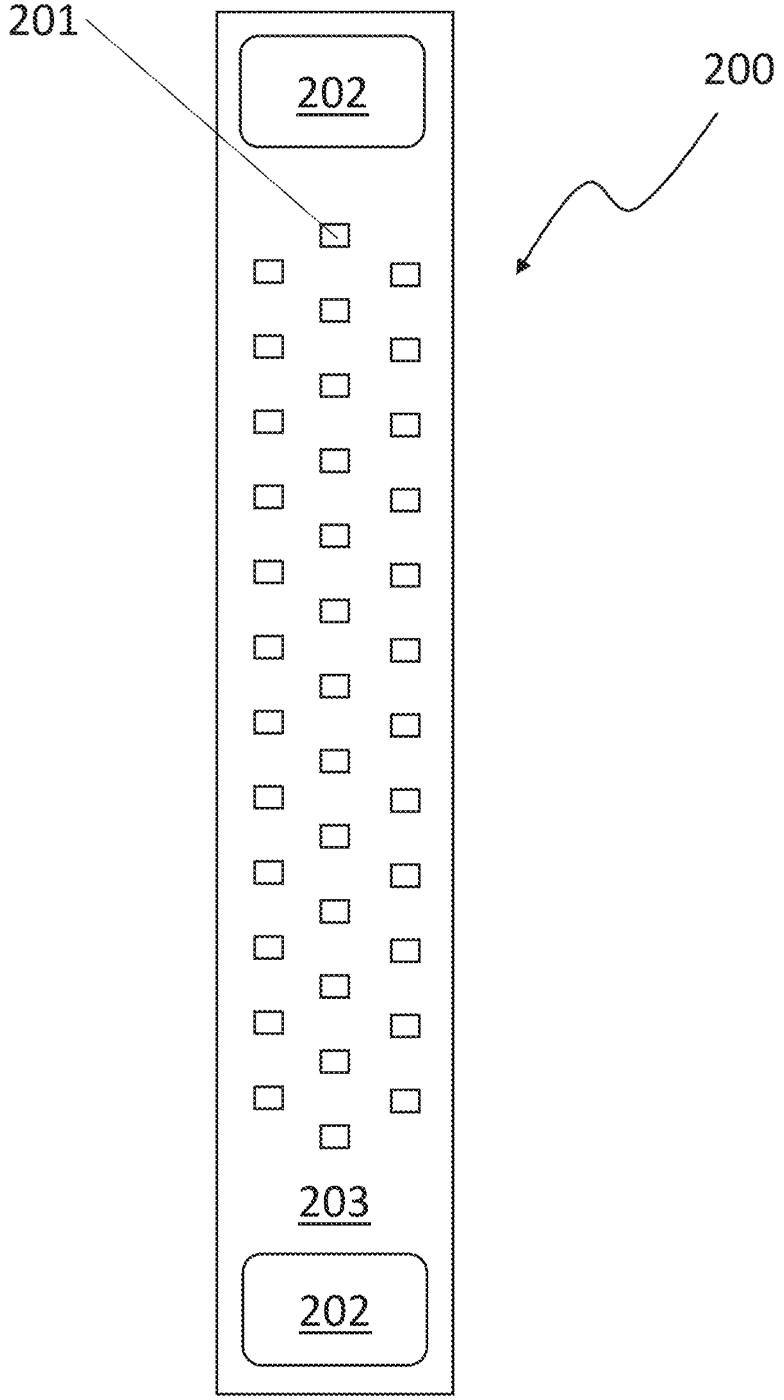
FIG. 2*b* is a top down view of a light source including a multiple strings of light emitting diodes (LEDs) that may be used in a light emitting diode (LED) tube, in accordance with one embodiment of the present disclosure.

FIG. 2A depicts one embodiment, in which a single string of light emitting diodes (LED) 201 is depicted, in which the string is arranged in a single column. FIG. 2B depicts another having a plurality of strings of light emitting diodes (LEDs) 201 present on a substrate 203, e.g., PCB substrate, in which the strings of light emitting diodes (LEDs) 201 are positioned in adjacent columns. In some embodiments, the strings of LEDs 201 are mounted on a PCB 203 which is mounted on inside surface of the tube 100, in which the tube 100 may be a glass tube or plastic tube. The LED driver 202 can be mounted inside the two end caps 301*a*, 301*b*. In some embodiments, the LED driver 202 is a switch mode power supply design. In some embodiments, a two stage design may be employed to get better efficiency while operating with a magnetic ballast.

Figure 3:
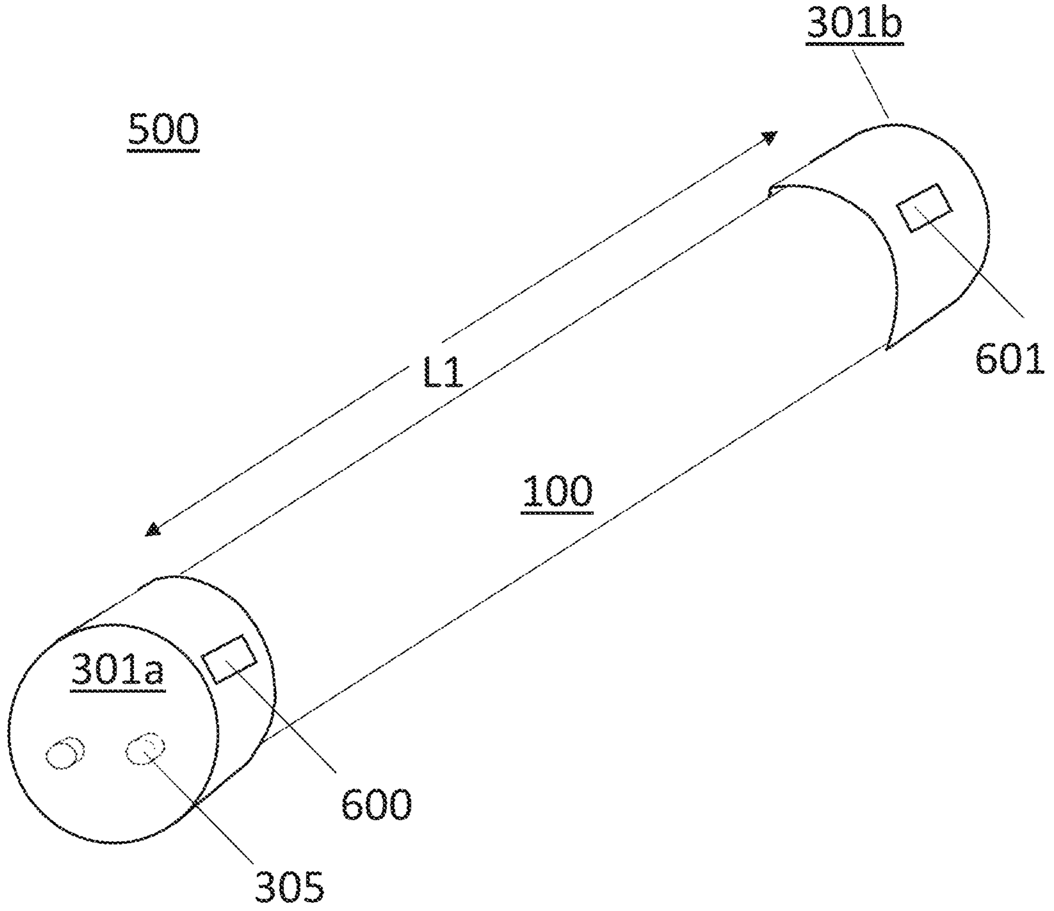
FIG. 3 is a perspective view of a light emitting diode (LED) tube, in accordance with one embodiment of the present disclosure.
Figure 4:
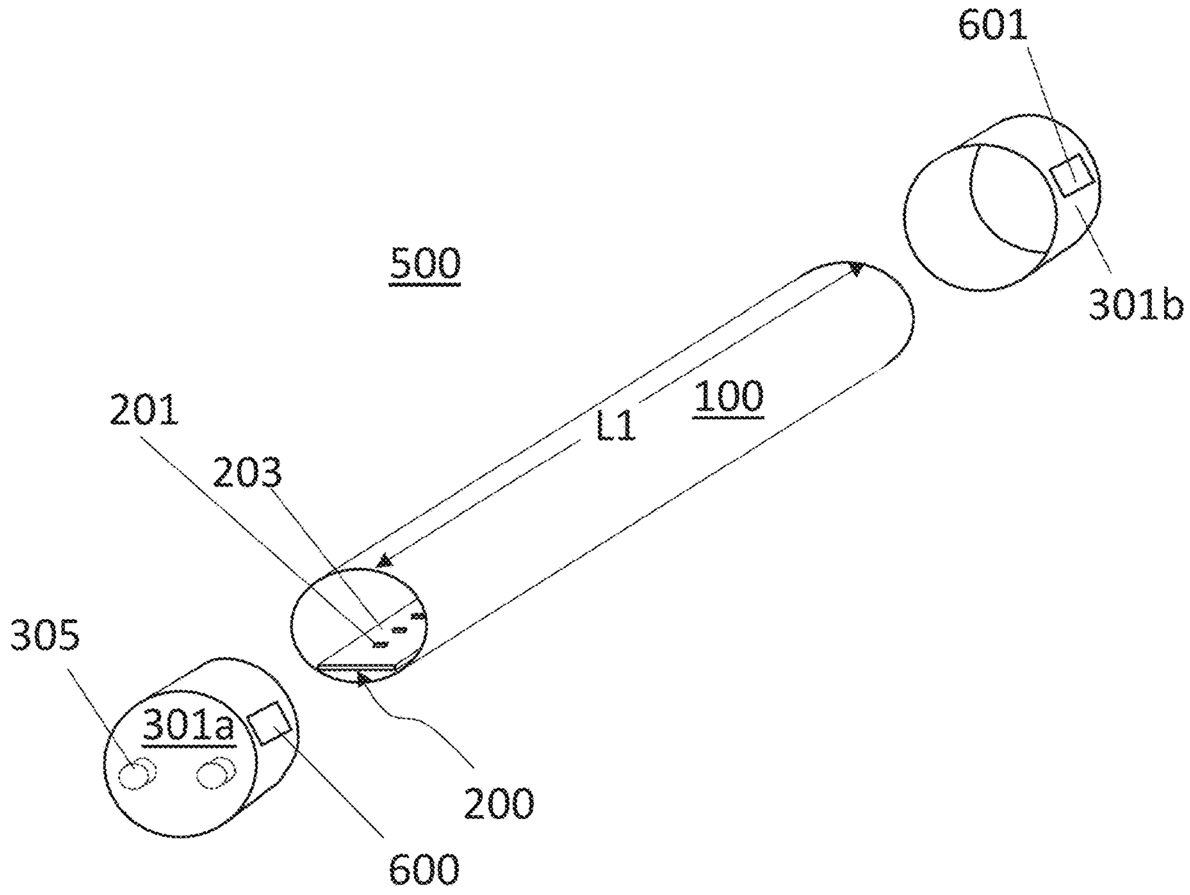
FIG. 4 is a perspective exploded view of the light emitting diode (LED) tube that is depicted in FIG. 3.
Figure 5:
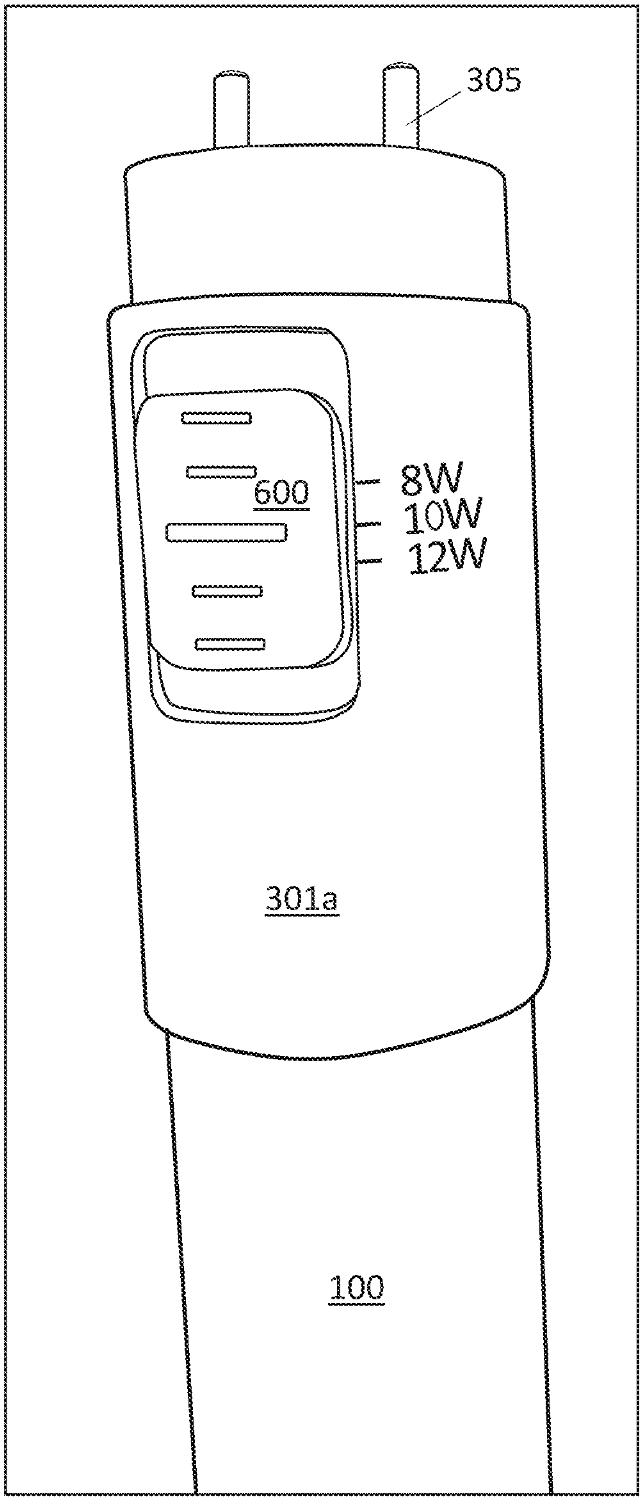
FIG. 5 is a magnified perspective view of the power level selector switch for selecting the power level for powering the light source in the tube lamp that is depicted in FIGS. 1, 3 and 4.

Referring to FIGS. 1-6, in some embodiments, the LED tube lamp 500 includes a power level selector switch 600 for selecting the power for illuminating the light emitting diodes 201 of the light engine that provides the light source 200. In some embodiments, the power level selector switch 600 for selecting the power for illuminating the light emitting diodes 201 of the light engine that provides the light source 200 may be positioned on an end cap 301*a* for the tube lamp. In some embodiments, selecting the power level for illuminating the light emitting diodes 201 will set a lumen setting for the light being emitted by the light source 200 of the tube lamp 500. Referring to FIG. 5, in some embodiments, an end cap 301*a* provides at least one interface on the lamp housing 100 for selecting a power level, e.g., the power level for selecting the power for illuminating the light emitting diodes 201 of the light engine that provides the light source 200.

Figure 6:
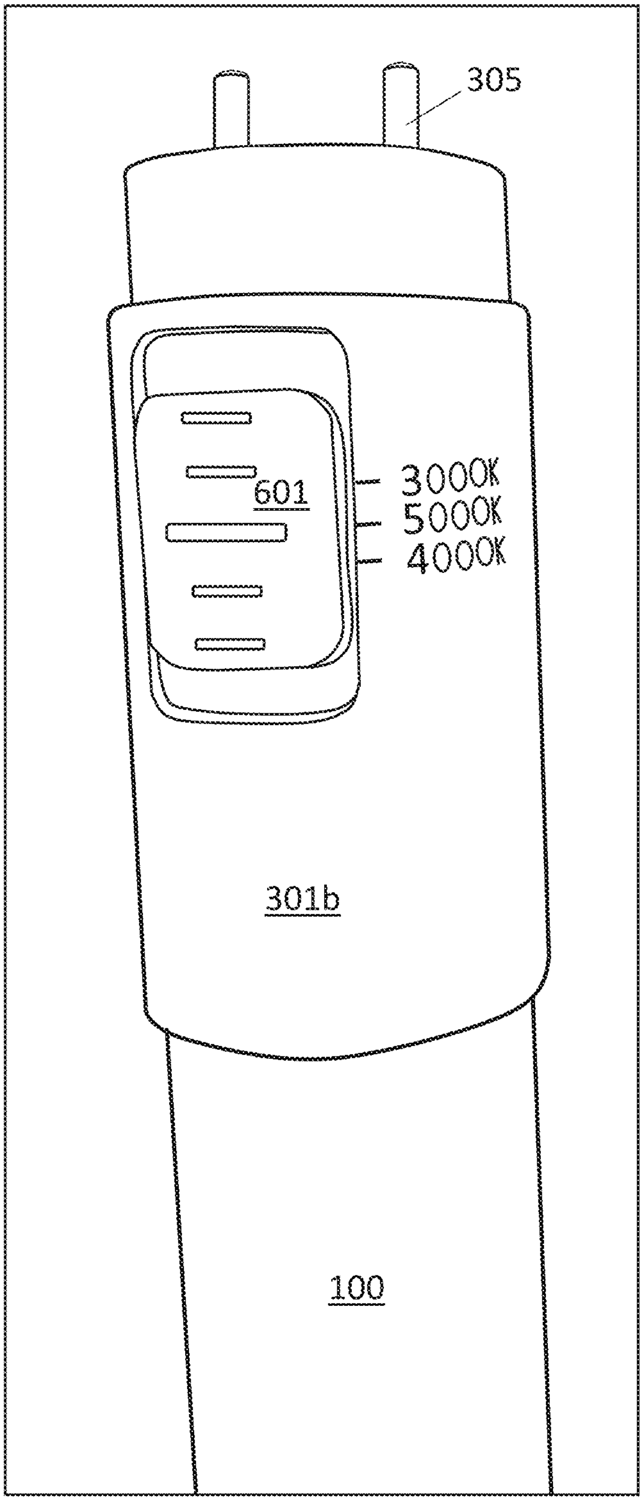
FIG. 6 is a magnified perspective view of the switch for selecting light color characteristics for light emitted by the light source in the tube lamp that is depicted in FIGS. 1, 3 and 4.

Referring to FIGS. 1-6, in some embodiments, the LED tube lamp 500 also includes a color select switch 601 for selecting the color correlated temperature (CCT) of the light source 200 of the tube lamp 500. In some embodiments, the color select switch 601 may be positioned on an end cap 301*b* for the tube lamp 500. Referring to FIG. 6, in some embodiments, the end cap 301*b* provides at least one interface on the lamp housing 100 for selecting a lighting characteristic, such as a correlated color temperature (CCT) of the tube lamp 500.

Referring to FIG. 5, in some embodiments, a first end cap 301*a* provides the interface for selecting the power level for illuminating the light emitting diodes 201, and a second end cap 301*b* that is present at an opposing end of the tube lamp 500 provides an interface for selecting a lighting characteristic, such as a correlated color temperature (CCT).

Although FIGS. 1-6 depict a single power level switch 600 that is specific for selecting correlated color temperature (CCT) positioned on one end cap 301*a*, and a single color select switch 601 for selecting a color characteristic of light emitted by the light source 200, e.g., color correlated temperature (CCT) is present on an opposing end cap 301*b*, the present disclosure is not limited to only this example. For example, in some embodiments both the power level select switch 600 and the color select switch 601 may be present on the same end cap. For example, both the power level select switch 600 and the color select switch 601 may be both positioned on one end cap, e.g., either of the end caps identified by reference numbers 301*a*, 301*b*, at one end of the tube lamp 500.

In some embodiments, the switches, e.g., the power level select switch 600 and the color select switch 601, for selecting each of the settings may be a slide switch, toggle switch, a pushbutton switch, and/or a selector switch. Slide switches are mechanical switches using a slider that moves (slides) from a first position to at least a second position, in which the different positions correspond to different selected light characterizations for emission. Toggle switches are actuated by a lever angled in one of two or more positions. Pushbutton switches are two-position devices actuated with a button that is pressed and released. Selector switches are actuated with a rotary knob or lever of some sort to select one of two or more positions. Like the toggle switch, selector switches can either rest in any of their positions or contain spring-return mechanisms for momentary operation. It is noted that the above examples are provided for illustrative purposes only, and are not intended to limit the types of switches that are to be used in accordance with the present disclosure. Any switch used to interrupt the flow of electrons in a circuit can be suitable for use as the switches, e.g., the power level select switch 600 and the color select switch 601. In one example, the simplest type of switch is one where two electrical conductors are brought in contact with each other by the motion of an actuating mechanism.

In the example depicted in FIG. 5, the power level select switch 600 for selecting the power level for illuminating the light being emitted by the light source 200 may be a three position sliding switch, in which the positions for selection by the switch 600 include power levels, such as 8 W, 10 W and 12 W. It is noted that the power level select switch 600 depicted in FIG. 5 is only one example. Other examples are equally applicable to the structures and methods described herein. For example, the power level select switch 600 for selecting the power level for illuminating the light being emitted by the light source 200 may be a three position sliding switch, in which the positions for selection by the switch 600 include power levels, such as 10 W, 13 W and 16 W.

Although not depicted in the supplied drawings, the power level select switch 600 may be labeled, e.g., and configured, for selecting lumen settings. For example, the power level select switch 600 may be configured to select a lumen setting from three possible settings. e.g., a first lumen setting of 700 LM, a second lumen setting of 900 LM, and a third lumen setting 1500 LM.

In the example depicted in FIG. 6, the switch 601 for selecting the light color characteristics for the light being emitted by the light source 200 may be a three position sliding switch, in which the positions for selection by the switch 601 include correlated color temperature (CCT) for values, such as 3000K, 4000K (or 3500K) and 5000K.

It is noted that the above described number of selectable settings provided by the switches 600, 601 is provided for illustrative purposes only and is not intended to limit the present disclosure. For example, the number of selectable settings that may be selected using the switches 600, 601 may be equal to 2, 3, 4, 5, 6, 7, 8, 9 and 10, as well as any range for the number of selectable settings including a lower limit provided by one of the aforementioned examples, and an upper limit provided by one of the aforementioned examples. Further, the values for the selectable settings, e.g., power level, lumen settings and correlated color temperature (CCT) settings, are not limited to those described above and depicted in FIGS. 1-6.

For example, a first switch, e.g., power level select switch 600, may select at least one power level for powering the light source 200 including the light emitting diodes 201 that is selected from the group consisting of 5 W, 6 W, 7 W, 8 W, 9 W, 10 W, 11 W, 12 W, 13 W, 14 W, 15 W, 16 W, 17 W, 18 W, 19 W, 20 W, 21 W, 22 W, 23 W, 24 W and 25 W, as well as any range for the power wattages including a lower limit provided by one of the aforementioned examples, and an upper limit provided by one of the aforementioned examples. In some embodiments, the power level select switch 600 may be labeled, e.g., and configured, second switch may be present for selecting lumen settings. For example, the first switch may select at least one lumen setting, e.g., a set of three lumen settings, selected from 500 LM, 600 LM, 700 LM, 800 LM, 900 LM, 1000 LM, 1100 LM, 1200 LM, 1300 LM, 1400 LM, 1500 LM, 1600 LM, 1700 LM, 1800 LM, 1900 LM and 2000 LM, as well as any range for the lumens associated with the light emitted by the LED tube including a lower limit provided by one of the aforementioned examples, and an upper limit provided by one of the aforementioned examples.

For example, a second switch, e.g., color selection switch 601, may select at least one correlated color temperature (CCT) setting selected from 2500K, 2600K, 2700K, 2800K, 2900K, 3000K, 3100K, 3200K, 3300K, 3400K, 3500K, 3600K, 3700K, 3800K, 3900K, 4000K, 4100 k, 4200K, 4300K, 4400K and 4500K, as well as any range for the correlated color temperature (CCT) associated with the light emitted by the LED tube including a lower limit provided by one of the aforementioned examples, and an upper limit provided by one of the aforementioned examples.

Although the switches 600, 601 are depicted as being mounted to the sidewall of the end cap 301*a*, 301*b*, this is only an illustrative embodiments, and it is not intended that the present disclosure be limited to only this example. Other embodiments within the scope of the present disclosure include at least one of the switches 600, 601 being mounted directly to the tube body 100, e.g., plastic tube body 100 or glass tube body 100, that encircles the light source 200. In yet other embodiments, at least one of the switches 600, 601 can be mounted to the PCB 203 of the light source 200. In this example, an access window may be present through either one of the end cap 301*a*, 301*b* and/or the tube body 100 through which the actuator of the switches 600, 601, e.g., button, lever, knob and/or slider, extends so that it may be manipulated by an operator for selecting the power level and/or lighting characteristics.

Referring to FIGS. 1-5, the lamp including the switches 600, 601 generally has a tube like geometry. For example, the lamp 500 can be either T8 or T12 type, i.e., have end caps 300*a*, 300*b* with a G13 pin design. Further the lamp 100 can either be 2', 3', 4' or 8' in length. The tube body 100 can be composed of a glass composition or can be composed of a plastic composition. The term "glass" denotes the material of the lamp tube 100 is composed of an amorphous solid material. The glass of the lamp tube body 100 may be any of various amorphous materials formed from a melt by cooling to rigidity without crystallization, such as a transparent or translucent material composed of a mixture of silicates. In some embodiments, the glass composition used for the glass tube body 100 is a soda lime silicate glass. In one example, the glass composition for the soda lime silicate glass that provides the glass of the glass tube body 100 contains 60-75% silica, 12-18% soda, and 5-12% lime. In some other examples, such as in high temperature applications, the glass composition used for the glass lamp tube 100 may be a borosilicate glass. Borosilicate glass is a silicate glass having at least 5% of boric oxide in its composition. It is noted that the above glass compositions are provided for illustrative purposes only, and are not intended to limit the glass tube body 100 to only the compositions that are described above, as any glass composition is suitable for use with the glass tube body 100. As noted above, the tube body 100 can also be composed of a plastic material.

Referring to FIGS. 3 and 4, in some embodiments, the glass tube body 100 has a cross-sectional geometry that is perpendicular to a length L1 of the glass tube body 100 with a substantially cylindrical perimeter defined by a sidewall of the glass tube body 100 enclosing a hollow interior for housing a light source. The length L1 of the glass tube body 100 extends from a first end of the glass tube body 100 for engagement by a first end cap 301*a* to a second end of the glass tube body 100 for engagement of a second end cap 301*b*. The length L1 of glass tube body 100 is greater than the width W1 (diameter) of the glass tube body 100. In some embodiments, the length L1 of the glass tube body 100 may range from 5" to 100", and the width W1, i.e., diameter, of the glass tube body 100 may range from 0.5" to 2.0". In one embodiment, the thickness T1 of the glass sidewall for the tube body 100 may range from 0.5 mm to 1.1 mm.

The dimensions. i.e., length L1 and width W1, of the glass tube body 100 may be selected to be consistent with the standard sizes of T8 and T12 fluorescent type lamps. For example, the length L1 and width W1 of the glass tube body 100 may be selected to be consistent with the T8 standard for fluorescent type lamps. In this example, the glass tube body 100 can have a width W1 (diameter) that is equal to 8/8", i.e., 1.0", and a length L1 that can be equal to 12", 24", 36", 48", 60" or 96". In yet another example, the length L1 and width W1 of the glass tube body 100 may be selected to be consistent with the T12 standard for fluorescent type lamps. In this example, the glass tube body 100 can have a width W1 (diameter) that is equal to 12/8", i.e., 1.5", and a length L1 that can be equal to 12", 24", 36", 48" or 60".

Referring to FIGS. 1, 2*a*, 2*b* and 4, the lamp 500 further includes a string of LEDs 201 are mounted on a PCB 203 which is mounted on inside surface of the glass tube 100. The at least one string of LEDs 201 provides the light source 200 for the LED tube lamp 500. The light source 200 is provided by a light emitting diode (LED) 201 and the substrate 203 is a circuit board, e.g., printed circuit board (PCB), on which the LEDs 201 are mounted as surface mount devices (SMDs). Although other light sources and substrates are suitable for use with the glass tube body 100 that is described herein in providing a lamp 500, the light source 200 is specifically referred to as having light emitting diodes 201, and the substrate 203 is hereafter referred to as a circuit board 203, e.g., printed circuit board. For example, in addition to semiconductor type light emitting diodes (LEDs), the light source may be organic light emitting diodes, laser diodes or any like light source.

FIGS. 2*a* and 2*b* are top down views of a light source 200 that can be housed within the tube body 100, in which the light source 200 includes a plurality of light emitting diodes (LEDs) 201, e.g., surface mount device (SMD) light emitting diodes (LED), that are present on a circuit board 203, e.g., printed circuit board. A light emitting diode (LED) 201 is a light source that can be a semiconductor device that emits visible light when an electric current passes through it. The LEDs 201 of the light source 200 can include at least one LED 201, a plurality of series-connected or parallel-connected LEDs 201, or an LED array 201. At least one LED array for the light source 200 can include a plurality of LED arrays. For example, the LEDs 201 may also be arranged in a single column that extends along a majority of the length of the circuit board 203.

Any type of LED may be used in the LEDs 201 of the light source 200. For example, the LEDs 201 of the light source 200 can be semiconductor LEDs, organic light emitting diodes (OLEDs), semiconductor dies that produce light in response to current, light emitting polymers, electro-luminescent strips (EL) or the like. The LEDs 201 can be mounted to the circuit board 203 by solder, a snap-fit connection, or other engagement mechanisms. In some examples, the LEDs 201 are provided by a plurality of surface mount discharge (SMD) light emitting diodes (LED) arranged in a plurality of lines on the circuit board 203.

In some embodiments, the LEDs 201 of the light source 200 can produce white light. However, LEDs 201 that produce blue light, purple light, red light, green light, ultra-violet light, near ultra-violet light, or other wavelengths of light can be used in place of white light emitting LEDs 201. In some embodiments, the emission wavelengths for the LEDs 201 of the light source 200 can range from approximately 380 nm to approximately 770 nm.

The LEDs 201 of the lamp 500 may also be selected to allow for adjusting the "color temperature" of the light they emit. The color temperature of a light source is the temperature of an ideal black-body radiator that radiates light of a color comparable to that of the light source. Color temperature is a characteristic of visible light that has applications in lighting, photography, videography, publishing, manufacturing, astrophysics, horticulture, and other fields. Color temperature is meaningful for light sources that do in fact correspond somewhat closely to the radiation of some black body, i.e., those on a line from reddish/orange via yellow and more or less white to blueish white. Color temperature is conventionally expressed in Kelvin, using the symbol K, a unit of measure for absolute temperature. Color temperatures over 5000 K are called "cool colors" (bluish white), while lower color temperatures (2700-3000 K) are called "warm colors" (yellowish white through red). "Warm" in this context is an analogy to radiated heat flux of traditional incandescent lighting rather than temperature. The spectral peak of warm-colored light is closer to infrared, and most natural warm-colored light sources emit significant infrared radiation. The LEDs 201 of the lamps provided by the present disclosure in some embodiments can be adjusted from 2000K to 7000K.

The LEDs 201 of the lamp 500 may also be selected to be capable of adjusting the light intensity/dimming of the light they emit. In some examples, dimming or light intensity may be measured using lumen (LM). In some embodiments, the dimming or light intensity adjustment of the LEDs 201 can provide for adjusting lighting between 100 LM to 2000 LM. In another embodiment, dimming or light intensity adjustment of the LEDs 201 can provide for adjusting lighting between 500 LM to 1750 LM. In yet another embodiment, the dimming or light intensity adjustment of the LEDs 201 can provide for adjusting lighting between 700 LM to 1500 LM.

The number of LEDs 201 for the light source 200 can be a function of the desired power of the lamp 500 and the power of the LEDs 201. For example, for a 48" lamp 500, the number of LEDs 201 that are present on the circuit board 203 of the light source can vary from about 5 LEDs 201 to about 400 LEDs 201, such that the lamp 500 outputs approximately 500 lumens to approximately 3,000 lumens.

The LEDs 201 for the light source 200 can be mounted on a circuit board 203, such as a printed circuit board (PCB). A printed circuit board (PCB) mechanically supports and electrically connects electronic components, such as the LEDs 201 and the driving electronics 202, using conductive tracks, pads and other features etched from copper sheets laminated onto a non-conductive substrate. The printed circuit board 203 is typically composed of a dielectric material. For example, the circuit board may be composed of fiber-reinforced plastic (FRP) (also called fiber-reinforced polymer, or fiber-reinforced plastic) is a composite material made of a polymer matrix reinforced with fibers. The fibers are usually glass, carbon, aramid, or basalt. The polymer is usually an epoxy, vinylester, or polyester thermosetting plastic, though phenol formaldehyde resins are still in use. In some embodiments, the printed circuit board (PCB) is composed of a composite consistent with the above description that is called FR-4. The printed circuit board 203 is not limited to the example shown in the figures. The printed circuit board 203 may be made in one piece or in longitudinal sections joined by electrical bridge connectors.

Still referring to FIGS. 2*a* and 2*b*, the printed circuit board 203 may further include an internal built in ballast. i.e., LED driver 202, and printed circuitry providing electrical communication between the ballast and the LEDs 201, e.g., surface mount discharge (SMD) light emitting diodes (LED). The LED driver 202 is an electrical device which regulates the power to the LED 201, or a string (or strings) of LEDs 201. In some embodiments, the LED driver 202 responds to the changing needs of the LEDs 201, or LED circuit, by providing a constant quantity of power to the LED 201 as its electrical properties change with temperature. In some embodiments, an LED driver 202 is a self-contained power supply which has outputs that are matched to the electrical characteristics of the LED or LEDs 201. In some embodiments, the LED driver 202 may offer dimming by means of pulse width modulation circuits and may have more than one channel for separate control of different LEDs or LED arrays 201. The power level of the LED 201 is maintained constant by the LED driver 202 as the electrical properties change throughout the temperature increases and decreases seen by the LED or LEDs 201. In some embodiments, the supply voltage of the LED driver 202 may be equal to 2.3V to 5.5 V, 2.7V to 5.5 V and/or 3V to 5.5 V. In some embodiments, the output current per channel that can be provided by the LED driver 202 can be between 250 μA and 50 A. In some other embodiments, the LED driver 202 can have an output current per channel ranging from 20 mA to 100 mA, e.g., 25 mA.

The LEDs 201 may be arranged as strings on the printed circuit board 70. When referring to a "string" of LEDs it is meant that each of the LEDs in the string are illuminated at the same time in response to an energizing act, such as the application of electricity from the driving electronics, e.g., driver, in the tube lamp 500. The LEDs 201 in a string of LEDs are electrically connected for this purpose. For example, when the string of LEDs 201 is energized for illumination, all of the LEDs in the string are illuminated. Further, in some embodiments, illuminating the first string of LEDs 201 does not illuminate the LEDs in the second string of LEDs 201, and vice versa, as they are independently energized by the driving electronics, and not electrically connected. It is also noted that the same LED may be shared by more than one string. FIG. 2A depicts one embodiment, in which a string of light emitting diodes (LED) 201 is depicted, in which the string is arranged in a single column. It is noted that although FIG. 2A illustrates a single column of light emitting diodes (LED), it is not necessary that the single column function as a single string. For example, different portions of the string of light emitting diodes (LEDs) may function as different strings. FIG. 2B depicts another having a plurality of strings of light emitting diodes (LEDs) 201 present on a substrate 203. e.g., PCB substrate, in which the strings of light emitting diodes (LEDs) 201 are positioned in adjacent columns. In FIG. 2B, each column of light emitting diodes (LEDs) 201 may function as an independent string. Although the following description may refer to three strings of LEDs, as illustrated in FIG. 2B, this is only an illustrative example, and not intended to limit the present disclosure to the LED arrangement specifically depicted in FIG. 2B. Any arrangement of LED strings may be employed to provide the different characteristics of light that can be emitted by the light source 200 of the tube lamp 500 responsive to light characteristic selection through the color selection switch 601 for selecting the light characteristics for the light being emitted by the light source 200.

For example, responsive to a light color selection via the light color selection switch 601 for selecting the light characteristics for the light being emitted by the light source 200, a first string of LEDs 201 may be illuminated to provide a correlated color temperature (CCT) of light emitted by the light engine 200 for the tube lamp 500 that is on the order of 3000K, a second string of LEDs 201 may be illuminated to provide an correlated color temperature (CCT) of light emitted by the light engine 200 for the tube lamp 500 that is on the order of 4000K (or 3500K); and a third string of LEDs 201 may be illuminated to provide an intensity of light emitted by the light engine 200 for the tube lamp 500 that is on the order of 5000K.

It is noted that the above examples of how different LED strings can be illuminated to provide different lighting values are provided for illustrative purposes only. The present disclosure is not limited to only these example, as other lighting characteristics can be assigned to strings of LEDs that can be selected by a user through the color selection switch 601. For example, the LEDs 201 of the light source 200 can be selected to be capable of being adjusted for the color of the light they emit. The term "color" denotes a phenomenon of light or visual perception that can enable one to differentiate objects. Color may describe an aspect of the appearance of objects and light sources in terms of hue, brightness, and saturation. Some examples of colors that may be suitable for use with the method of controlling lighting in accordance with the methods, structures and computer program products described herein can include red (R), orange (O), yellow (Y), green (G), blue (B), indigo (I), violet (V) and combinations thereof, as well as the numerous shades of the aforementioned families of colors. It is noted that the aforementioned colors are provided for illustrative purposes only and are not intended to limit the present disclosure as any distinguishable color may be suitable for the methods, systems and computer program products described herein.

Referring to FIGS. 3 and 4, in some embodiments, once the light source 200 is positioned within the tube body 100, end caps 301*a*, 301*b* may be positioned on each end of the tube body 100 having electrical contacts for communication between a lamp fixture and the LED driver 202 of the light source 200, hence providing power to the lamp 500. In some embodiments, each of the end caps 300*a* are composed of a polymeric material, such as silicone; a metal material, such as aluminum, or a combination, i.e., assembly, thereof. The end faces of each end cap 300*a*, 300*b* include a pair of contacts 305 for engagement with a lamp fixture. The contacts 305 are typically composed of a metal, such as aluminum, steel or copper. The contacts 305 may have a pin type geometry. To provide that the LED tube lamp 500 is compatible with T8 and T12 type lamps, the contacts 305, i.e., pins, may have a geometry that engages a G13 socket. The G13 pin type is a double pin design, in which the center to center distance between the two pins is 0.50 inches (12.7 mm), and the pin diameter is 0.093 inches (2.35 mm). In some embodiments, wires (not shown) can provide electrical communication between the end caps 300*a*, 300*b*, i.e., the contacts 305 of the end caps 301*a*, 301*b*, to the electrical components of the circuit board 203, such as the electronics driver 202 for the LEDs 201. In some embodiments, the wires are made of metals, and preferably made of copper or steels. Electrical junctions can be provided through mechanical fasteners, such as nut and bolt arrangements, and/or solder like connections. As noted above, in some embodiments, the end caps 301*a*, 301*b* may include a power select switch 600 for selecting the power to illuminate the light source 200 including the light emitting diodes (LEDs) 201, and/or a color select switch 601 for selecting the light characteristics for the light being emitted by the light source 200. In some embodiments, the switches 600, 601 are directly positioned on an exterior sidewalls of the end cap 301*a*, 301*b*, as depicted in FIGS. 5 and 6.

Figure 7:
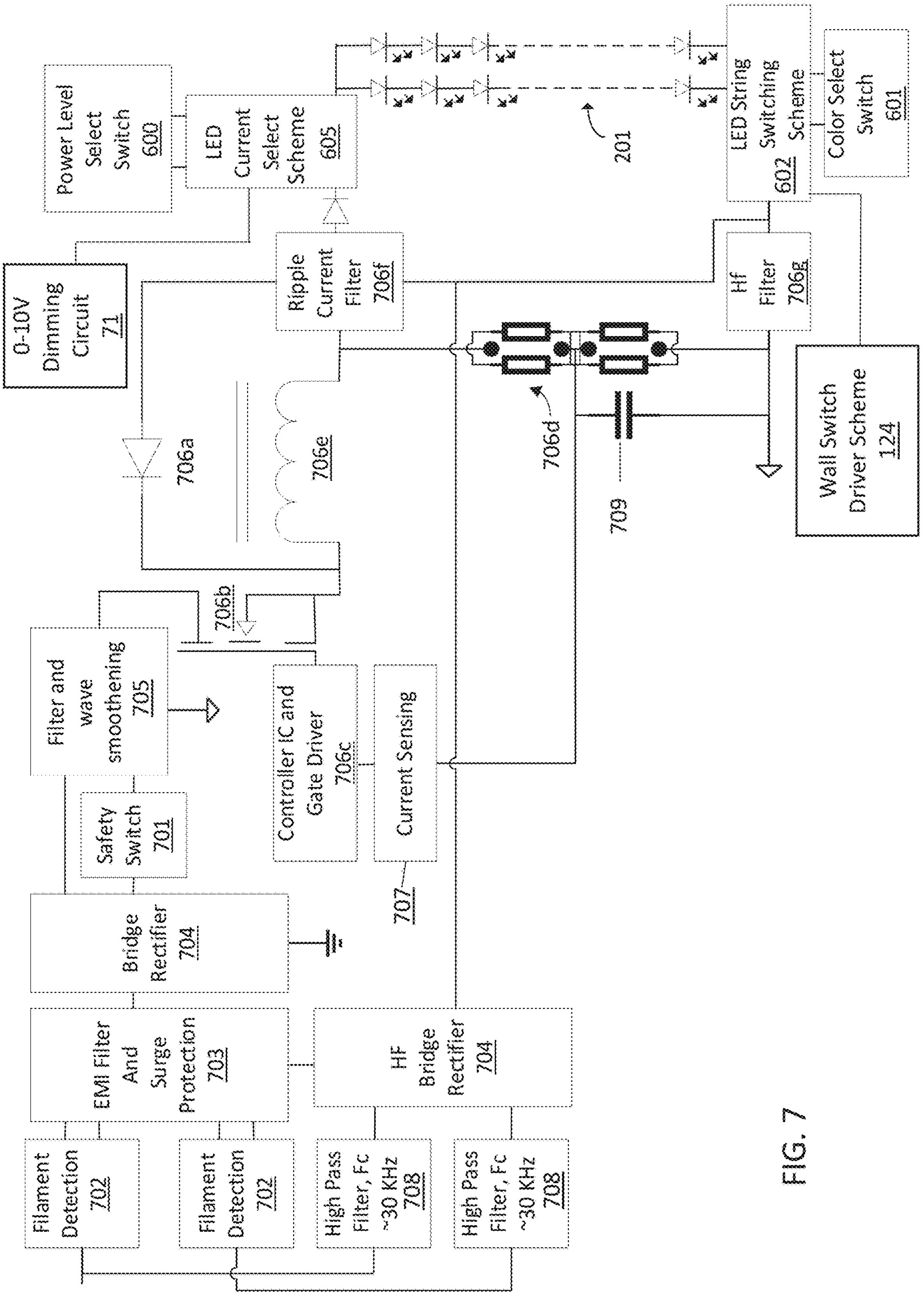
FIG. 7 is a block/circuit diagram illustrating at least a portion of the electronics package for the light emitting diode (LED) tube that has been described with reference to FIGS. 1-4.

In some embodiments, the LED lamp 500, e.g., T8 LED hybrid tube lamp, can be used in any application or fixture that requires a compatible T8, T12 ballast or direct line voltage. Referring to FIG. 7, the electronics package 700 for the light emitting diode (LED) tube lamp 500 employs a driver design that will convert the input high frequency or line frequency alternating voltage and current to a suitable DC voltage and current to drive the LED string 201 inside the lamp 500. In one embodiment, the electronics package 700 may include a filament detection portion 702, an EMI filter and surge protection portion 703, a high frequency (HF) bridge rectifier 704, a filter and wave shape smoothing portion 705, a current sensing portion 707, and LED strings 201, as well as a power level selection switch 600 for selecting the power to illuminate the light emitting diodes (LEDs) of the light source 200, and the color selection switch 601 for selecting the light characteristics for the light being emitted by the LED strings 201. The electronics package 700 may also include an electronic safety switch 701 and at least one high pass filter 708.

The filament detection portion 702 of the electronics package 700 has a passive resistor-capacitor circuit (RC circuit) that simulates the filament load of the traditional florescent lamp. For type A applications, i.e., type A T8 lamps, the impendence is adjusted to allow for a smooth startup when operated with high frequency (HF) ballasts and also improves the ballast compatibility. Type A applications may have an electronic ballast. The filament detection portion 702 provides high voltage and current for startup conditions for the Type A application, i.e., Type A T8 lamps. Following start up, the voltage and current in a Type A applications, i.e., Type A T8 lamps, will be reduced to a normal operating range. With Type B applications (line voltage), i.e., no ballast, this circuit does not play any role. The filament detection portion 702 of the electronics package is further described below with reference to FIG. 7.

The EMI Filter and Surge protection portion 703 of the electronics package 700 can play a significant role during direct line voltage (Type B) application. EMI circuit filters the high frequency noise generated by downstream converter from entering the mains input terminals of line and neutral. The surge protector protects the lamp from the surges caused by events such as lightning and line disturbances from the mains grid.

The HF Bridge Rectifier portion 704 of the electronics package 700 is high frequency rectifier which rectifies the AC input voltage from all the source i.e., from line voltage or from ballast (both electronic and magnetic) and convert it to pulsating DC. The rectifiers used are fast recovery type of didoes. During HF ballast application, as the input voltage from the ballast are high frequency thus its extremely important to use the fast recovery diode for the smooth rectification.

The electronic safety switch 701 of the electronics package 700 is a safety switch on the lamp to help avoid electrical shock to the user (for type B applications and in instance where they are trying to install with power on). The electronic safety switch 701 is such that it only allows to be switched on only when both the end cap pins 305 of the tube are inserted & seated properly in to the lamp socket.

The Filter and Wave Shape Smoothing portion 705 of the electronics package 700 provides additional filter circuits that removes any high frequency signal from the low frequency waveform during line voltage and magnetic ballast applications. It also helps to smooth the wave shape for the downstream converter in case of magnetic ballast application.

The Filter and Wave Shape Smoothing portion of the electronics package 700 is based on a buck converter topology and contains freewheeling diode 706*a*, switch 706*b*, controller IC 706*c*, starting resistor 706*d*, switching inductor 706*e* and ripple current filter 706*f*. This section generates the required voltage and current as per the need of the LED strings 201. In some embodiments, this is a constant current control mechanism that maintains a constant current to the LED string 201 in spite of change in input voltage. The high frequency filter 706*g* at the LED return path helps in fine tuning the high frequency noise in the output current.

In some embodiments, a capacitor 709 is also present in the electronics package 700 to filter out high frequency noise. This can provide that the current sensing is a clean signal without any high frequency noise.

The current sensing portion 707 of the electronics package 700 senses the switching inductor current which represents the LED current and provides the feedback to the controller IC according to which the frequency of operation or the ON time of the switch is adjusted to maintain a constant LED current.

The block diagram/circuit diagram further depicts the LED strings 201. The number of LEDs, number of LED strings, their color temperature etc. are chosen based on the requirement for the light output characteristics. These LED strings are driven by the voltage and current generated by the buck converter. Lighting characteristics for the light emitted by the LED strings 201 can be assigned to strings of LEDs by a user through the color selection switch 601. The switch 601 for selecting each of the settings for light being emitted by the light source 200 is further described above with reference to FIGS. 1-6.

Figure 8:
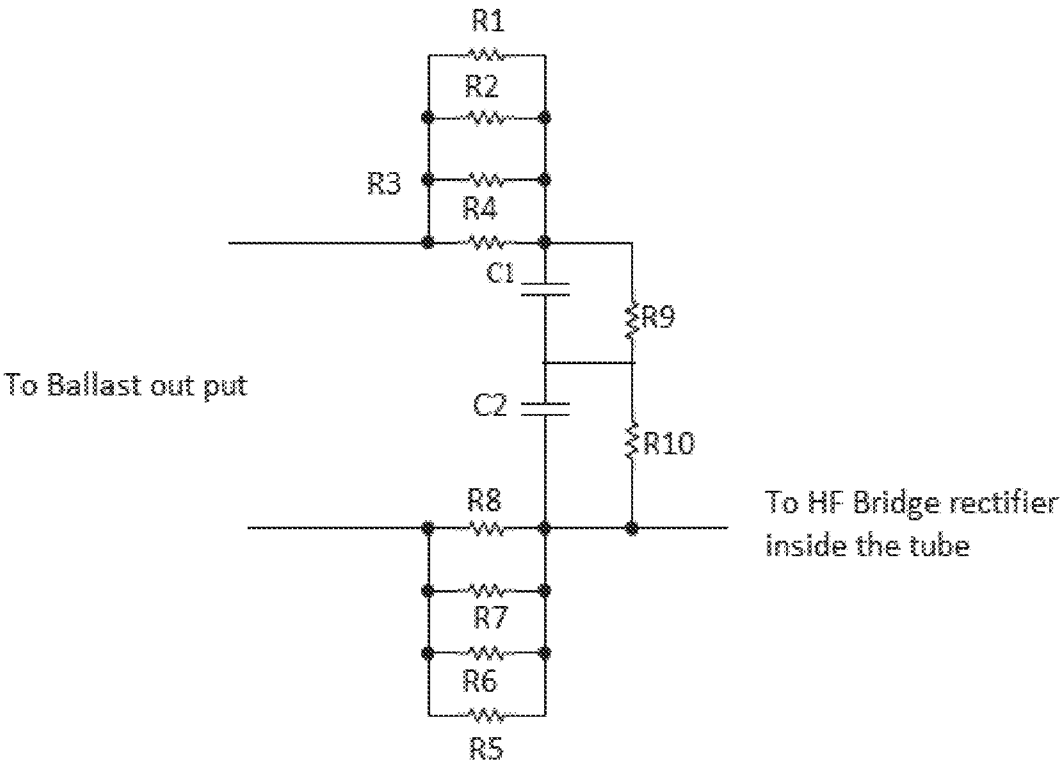
FIG. 8 is a circuit diagram for the filament detection circuit that is depicted in the block/circuit diagram that is depicted in FIG. 7.

FIG. 8 is a circuit diagram for the filament detection circuit, i.e., filament detection portion 702, that is depicted in the block/circuit diagram that is depicted in FIG. 7. The ballasts in Type A applications are designed to provide high frequency & high voltage to the filament of a traditional fluorescent lamp during lamp start up. The filament of the traditional lamp is resistive in nature.

The values of resistors R1, R2, R3, R4, R5, R6, R7, R8, R9, R10 and the capacitors C1, C2 are chosen such way that the circuit sustains the high voltage start up and exhibits a low impendence during normal operation of the ballast.

In some examples, during startup, i.e., high voltage start up, ballast provide a high voltage close 600 Vrms its open circuit voltage for a very short duration. Ballasts are designed to provide this voltage (>600 Vrms) when they powered on the florescent lamp in order to heat up the cathode filament of the florescent lamp so that it can emits the electrons and ignite the lamp. This is the typical characteristic of a florescent lamp with LED lamp this voltage is not required to ignite the LEDs however ballast are still able to enter in to this high voltage strike, which is close to 600 Vrms.

The starting method of the ballast is to detect the filament of the florescent lamp. Each florescent lamp is having a cathode filament. For 32 W florescent lamp the cathode filament impedance is close to Rsub ~12Ω and having a Rc (cold resistance)/Rh (hot resistance)~3.40. In designing the LED lamp, the resistor capacitor (RC) network chosen to replace this impedance of the florescent lamp, so that ballast can understand there is a cathode resistance present and thus can start its accessories circuit. This impedance is the low impendence during normal operation of the ballast.

This will help ballast to get a proper start up current to turn on the IC and other start up circuit inside the ballast. Each end of the LED tube 100, e.g., at the cap 300*a*, 300*b* has this filament circuit available.

The electronics package for the light emitting diode (LED) tube that is depicted in FIG. 7 may further include a power selection switch 600 for selecting the power level to illuminate the light source 200 including the light emitting diodes 201, and a current select scheme 605 positioned between the power selection switch 600 and the light emitting diodes 201 of the light source 200.

Figure 9:
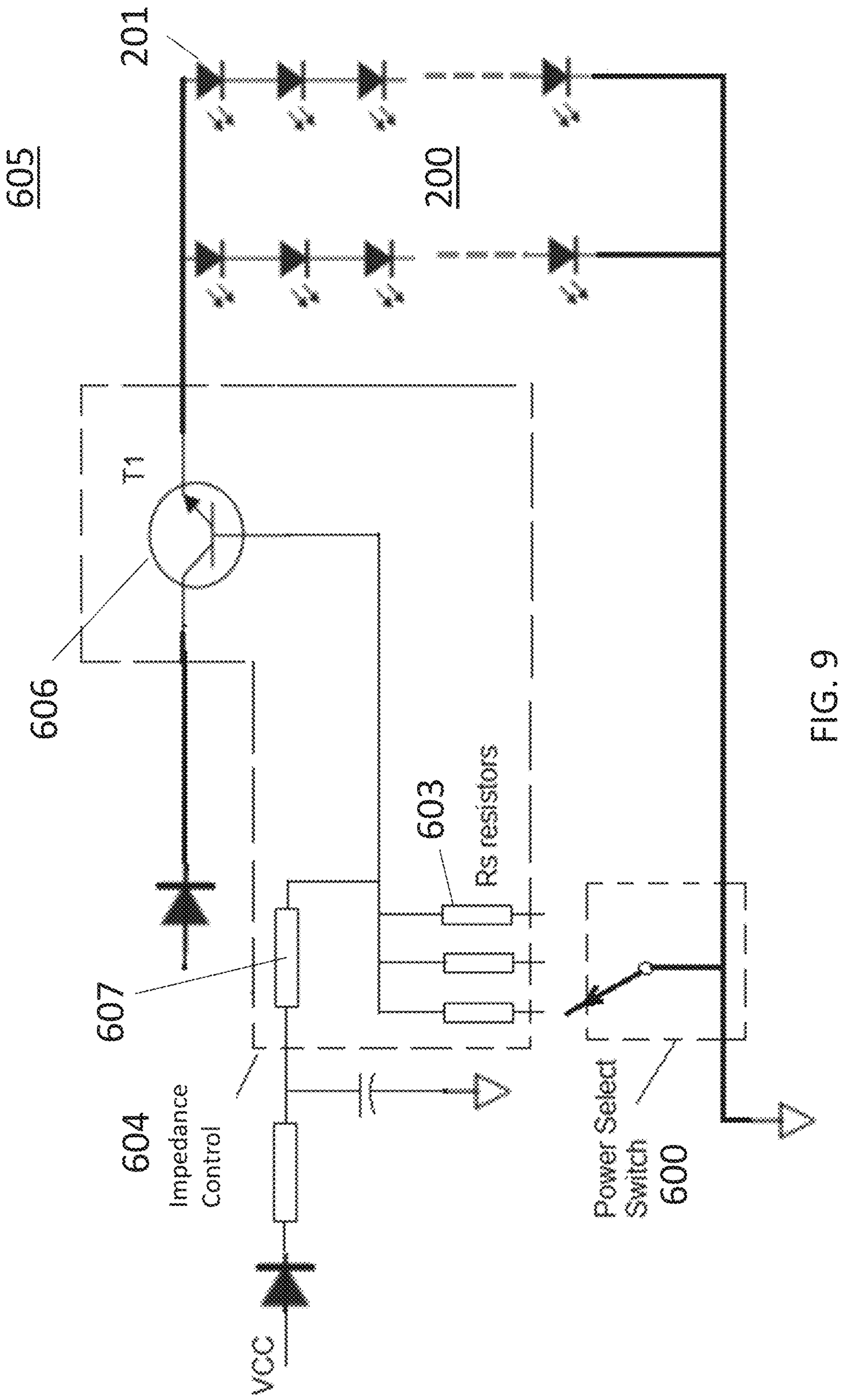
FIG. 9 is a circuit diagram for current selection scheme that functions in combination with the power level selector switch that is depicted in the block/circuit diagram that is depicted in FIG. 7.

FIG. 9 is a circuit diagram for current selection scheme 605 that functions in combination with the power level selector switch 600 to deliver the selected power to the light source 200 for illuminating the light emitting diodes 201. In some embodiments, the current select scheme 605 is composed of an impendence control circuit 604 and a power select switch 600. The output current to LED string 201 can be controlled through the Impendence control circuit 604 that includes a transistor T1 606, and its biasing circuit. The transistor may be a junction transistor, such as a bipolar junction transistor, or a field effect transistor, such as a metal semiconductor oxide field effect transistor (MOSFET). However, any transistor that provides for selecting the resistors Rs 603 of the impedance control circuit 604 is applicable to the designs depicted in FIG. 9. The bias setting is achieved by different resistor select (Rs) 603 The resistance for the different resistors 603 may be selected to provide the current to the light source 200, e.g., strings of the light emitting diodes 201, in accordance with the power being selected through the power select switch 600. The collector to emitter impendence of the transistor T1 606, and the current to the LED string 201, is controlled by the value of resistor 603 connected to base of transistor T1 606. The selection of the resistors Rs 603 is executed though an external mechanical switch, e.g., the power select switch 600.

In some embodiments, the transistor T1 606 operates in active region where the base current is set by the upper resistor R 607 and select resistors Rs 603, which ties to external power select switch 600. The select resistors Rs 603 connected to the base of the transistor T1 606 in an arrangement that provides that when higher power is selected by power select switch 600, the transistor T1 606 is fully "ON", and operates in the saturation region. The transistor T1 606 being fully "ON", and operating in the saturation region provides a low resistance to LED current. In low power and mid power settings, the select resistors Rs 603 value is selected to operate the transistor T1 606 in its active region. The transistor T1 606 behaves as a series resistance to control the current to LED string accordingly. In summary, the current (and the power) to the LED Load is set by T1, which is a function of bias setting resistors Rs 603 which in turn is set by external power select switch 600.

In some embodiments, in addition to the power level select switch 600 and the color select switch 601, the tube lamp 500 may also include a third light setting that can be controlled through a remote wall switch, i.e., ON/OFF wall switch, as described with reference to FIGS. 10-12.

Figure 10:
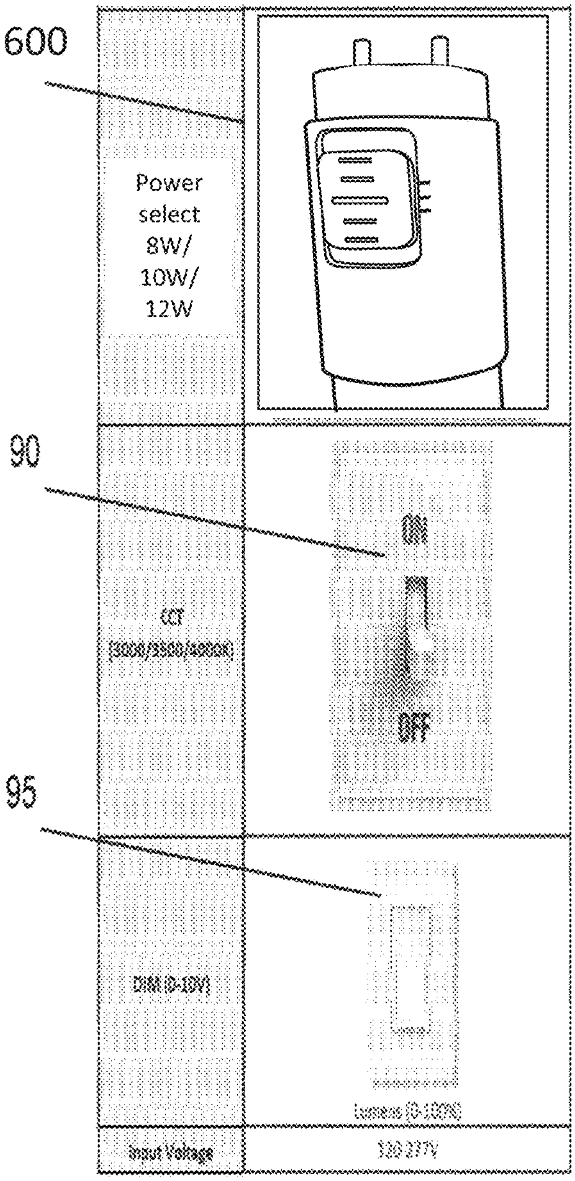
FIG. 10 is a perspective view of lamp design including a housing having a tube lamp geometry and a light engine including at least one string of light emitting diodes (LEDs), in which the lamp also includes a power level switch for selecting at least one lumen setting for the light emitted by the light engine fixed to the housing, an "ON"/"OFF" wall switch for selecting at least one correlated color temperature (CCT), and a remote dimmer switch for adjusting the dimming/intensity of the light emitted by the lamp, in accordance with one embodiment of the present disclosure.

FIG. 10 depicts a lamp design including a housing having a tube lamp geometry and a light engine including at least one string of light emitting diodes (LEDs), in which the lamp also includes a power level switch 600 for selecting a power level for illuminating a light source 200. e.g., powering the light emitting diodes (LEDs) 201 of a light source 200; an "ON"/"OFF" wall switch 90 for selecting at least one correlated color temperature (CCT); and a remote dimmer switch 95 for adjusting the dimming/intensity of the light emitted by the lamp.

Figure 11:
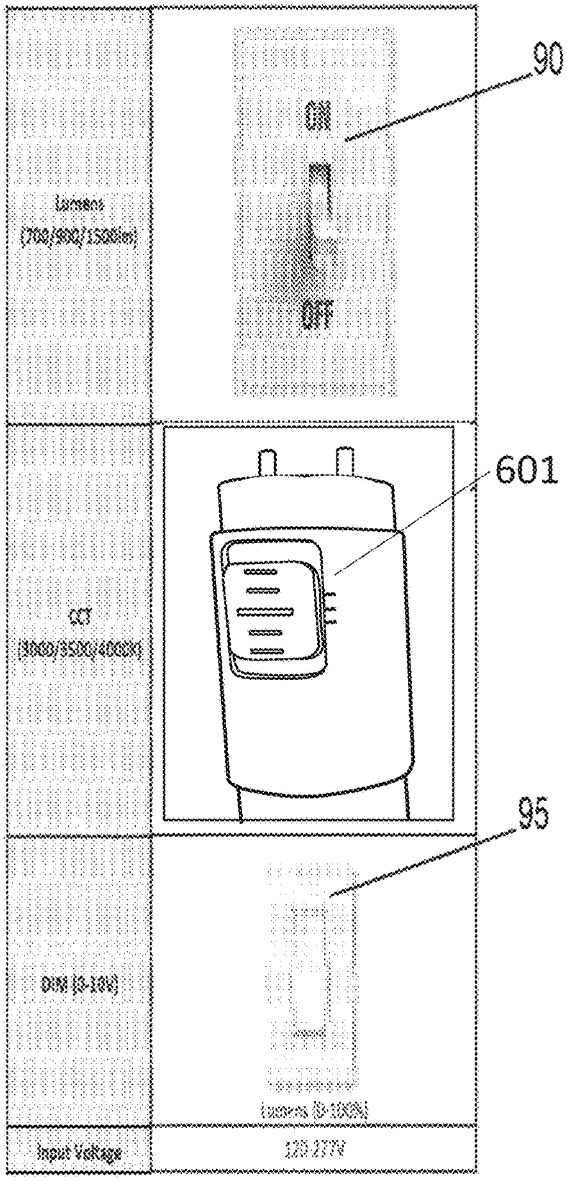
FIG. 11 is a perspective view of lamp design including a housing having a tube lamp geometry and a light engine including at least one string of light emitting diodes (LEDs), in which the lamp also includes a switch for selecting at least one correlated color temperature (CCT) setting for the light emitted by the light engine fixed to the housing, an "ON"/"OFF" wall switch for selecting at least one lumen setting for light emitted by the lamp, and a remote dimmer switch for adjusting the dimming/intensity of the light emitted by the lamp, in accordance with one embodiment of the present disclosure.

FIG. 11 depicts a lamp design including a housing having a tube lamp geometry and a light engine including at least one string of light emitting diodes (LEDs), in which the lamp also includes a color select switch 601 for selecting at least one correlated color temperature (CCT) setting for the light emitted by the light source 200; an "ON"/"OFF" wall switch 90 for selecting at least one lumen setting for light emitted by the lamp, and a remote dimmer switch 95 for adjusting the dimming/intensity of the light emitted by the lamp, in accordance with one embodiment of the present disclosure.

Figure 12:
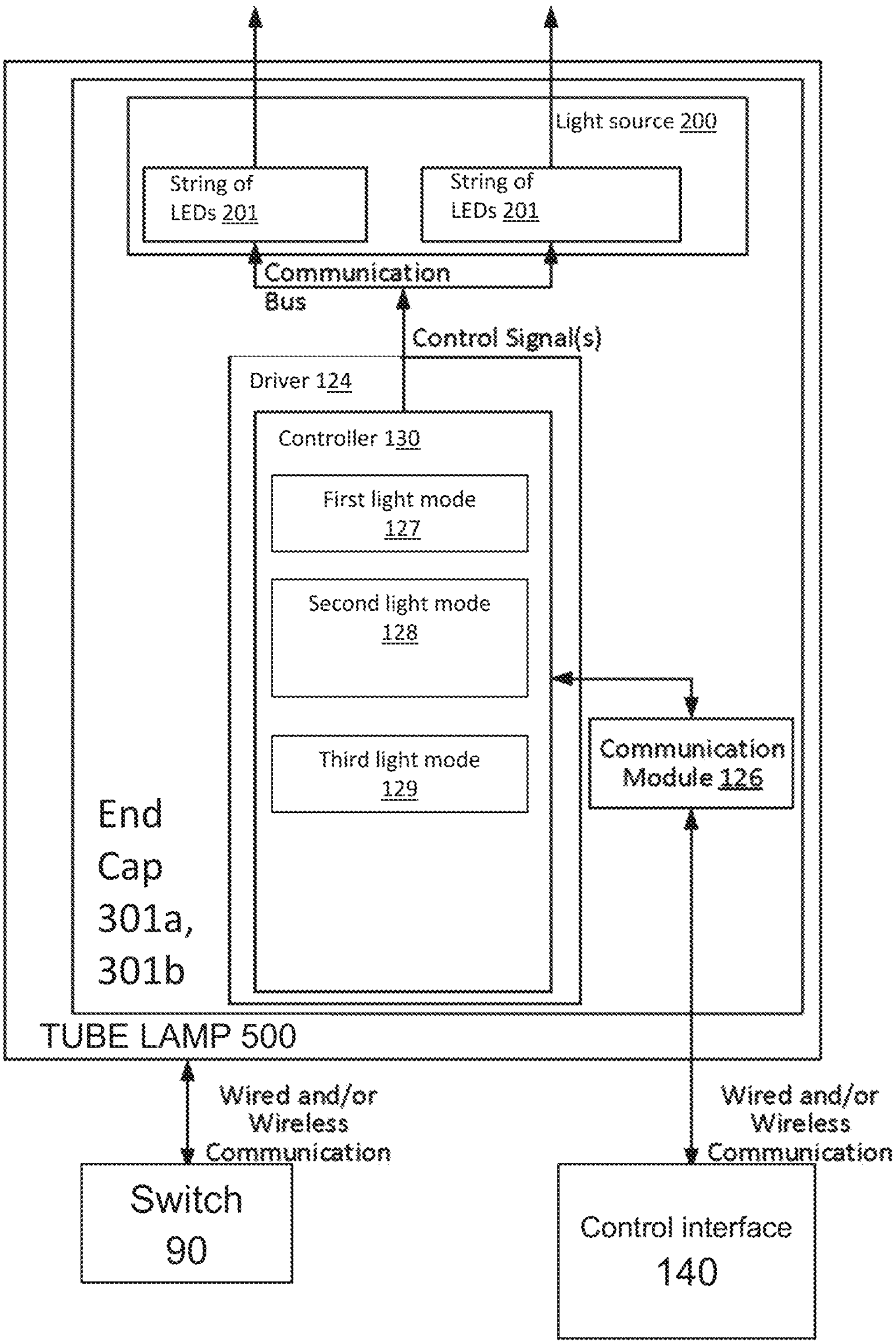
FIG. 12 is a bock diagram for a driver scheme to provide for switching between light modes, i.e., different settings for power level selection, lumens, dimming and correlated color temperature of light, being emitted by a tube lamp using an ON/OFF light switch 90, as described with reference to FIGS. 10 and 11, in accordance with one embodiment of the present disclosure.

FIG. 12 is a bock diagram for a wall switch driver scheme 124 to provide for switching between light modes, i.e., different settings for power level selection, lumens, dimming and correlated color temperature of light, being emitted by a tube lamp 500 using an ON/OFF light switch 90, as described with reference to FIGS. 10 and 11. The wall switch driver scheme 124 may be in electrical communication with the LED string switch scheme 602 of the electronics package depicted in FIG. 7.

FIG. 10 depicts one embodiment of a lamp design including a housing having a tube lamp geometry and a light engine 200 including at least one string of light emitting diodes (LEDs) 201, in which the lamp also includes a power level select switch 600 for selecting at least one power setting for illuminating the light source 200, an "ON"/"OFF" wall switch 90 for selecting at least one correlated color temperature (CCT), and a remote dimmer switch 95, i.e., 0-10V dimmer wall switch, for adjusting the dimming/intensity of the light emitted by the lamp. The power select switch 600 has been described above with reference to FIGS. 1-5. As noted, in one example, the power select switch 600 may be used to select one of three power levels, such as 8 W, 10 W and 12 W. It is noted that any example of the power select switch 600 described above is suitable for the embodiments described herein with reference to FIGS. 10-12. FIG. 11 also depicts a lamp design including a housing having a tube lamp geometry and a light engine 200 including at least one string of light emitting diodes (LEDs) 201, in which the lamp also includes a color select switch 601 for selecting at least one color setting for illuminating the light source 200, an "ON"/"OFF" wall switch 90 for selecting at least one lumen level, and a remote dimmer switch 95, i.e., 0-10V dimmer wall switch, for adjusting the dimming/intensity of the light emitted by the lamp. The color select switch 601 has been described above with reference to FIGS. 1-6. As noted, in one example, the color select switch 601 may be used to select one of three color correlate temperature (CCT) values, such as 3000K, 3500K and 4000K. It is noted that any example of the color select switch 601 described above is suitable for the embodiments described herein with reference to FIGS. 10-12.

In addition to the light source 200 being in electrical communication with the power level select switch 600, and the color select switch 601, the light source 200 including the light emitting diodes 201 may also be in electrical communication with a receiver for receiving setting commands for dimming and intensity of the light being emitted by the lamp. Referring to FIGS. 10 and 11, in some embodiments, the dimming function may be controlled through a 0-10V dimming wall switch 95. The 0-10V dimming wall switch 95 is remotely mounted from the tube lamp 500. The 0-10V dimming wall switch 95 communicates with a 0-10V dimming circuit 71 in the electronics package of the tube lamp 500, as illustrated in FIG. 7.

Referring to FIG. 7, the 0-10V dimming circuit 71 is in electric communication with a 0-10V dimming input that receives the signal from the 0-10V dimming wall switch 95. The 0-10V dimming circuit 71 is in electrical communication with the LEDs 201. The 0-10V dimming circuit 71 may be referred to as a 0-10 dimmable LED driver. In lighting control applications, "0-10" describes the use of an analog controller to adjust the voltage in a 2-wire (+10 VDC and Common) bus connecting the controller to one or more LED drivers equipped with a 0-10 VDC dimming input. A 0-10V dimmable LED driver includes a power supply circuit that produces approximately 10 VDC for the signal wires and sources an amount of current in order to maintain that voltage. The controlled lighting should scale its output so that at 10 V, the controlled light should be at 100% of its potential output, and at 0 V it should at the lowest possible dimming level.

A 0-10V LED dimmable driver designs with a control chip. The 0-10V voltage changes, the power supply output current will change. For example, when the 0-10V dimming signal modulates to 0V, the output current will be 0, the brightness of the light will be off; when the 0-10V dimming modulates to maximum 10V, the output current will reach 100% power output, the brightness will be 100%.

In the embodiment that is depicted in FIG. 10, the correlated color temperature (CCT) of the light being emitted by the tube lamp 500 may be selecting through a wall ON/OFF switch 90. In one example, when the light source 200 is configured to provide for three selectable correlated color temperatures (CCTs), which can include 2700K, 3500K, and 4000K, the light color (CCT) is switched between the three options by flipping the wall ON/OFF switch 90 until the desired CCT is selected. In the embodiment that is depicted in FIG. 11, the lumen level for the light emitted by the tube lamp 500 is switched between three selectable lumen levels by flipping the wall ON/OFF switch 90 until the desired lumen level is selected. In one example, the three selectable lumen levels can include 700 lumens, 900 lumens and 1500 lumens. The switch 90 may be in wired or wireless communication with the tube lamp 500. In some embodiments, when the tube lamp 500 is turned on initially by toggling the switch 90 to its ON position, the tube lamp 500 will enter its first emission mode, e.g., a first correlated color temperature of 2700K or a first lumen level of 700 LM. If the tube lamp 500 is then turned off (by toggling the switch 90 into its off position) and on again (by toggling the switch 90 to its on position) within a specified time window, the tube lamp 500 can enter the second emission mode, e.g., a second correlated color temperature of 3500K or a second lumen level of 900 LM. If the tube lamp 500 is thereafter turned off again (by toggling the switch 90 into its off position) and on again (by toggling the switch 90 to its on position) within a specified time window, the tube lamp 500 can enter the third emission mode, e.g., a third correlated color temperature of 4000K or a third lumen level of 1500 LM. If the tube lamp 500 is thereafter turned off again (by toggling the switch 90 into its off position) and on again (by toggling the switch 90 to its on position) within a specified time window, the tube lamp 500 will return to the first emission mode, e.g., a first correlated color temperature of 2700K or a first lumen level of 700 LM.

The duration of each of time window for toggling the switch 90 to change lighting modes may be customized, as desired, and in at least some cases may be about 3 seconds or less. For example, in some embodiments, the duration of the time windows may be about 2.5 seconds or less. In another example, the duration of the time windows may be about 2 seconds or less. In yet another example, the duration of each of the time windows may be about 1.5 seconds or less. In some instances, either (or both) the first and second time windows may be user-programmable.

Referring to FIG. 12, in some embodiments, a wall switch driver 124 may be a single-channel or multi-channel electronic driver configured to drive the solid state light emitters, e.g., LEDs 201, utilizing pulse-width modulation (PWM) dimming or any other suitable standard, custom, or proprietary driving techniques to provide the different light setting selected through the wall ON/OFF switch 90, as described with reference to FIGS. 10 and 11. The wall switch driver 124 may be in electrical communication with the LED string switching scheme 602, as depicted in FIG. 7.

As further shown in FIG. 12, the driver 124 may include a controller 130. In accordance with some embodiments, the driver 124 may be configured to provide a tube lamp 500 with a three-mode operation; that is, the driver 124 may provide tube lamp 500 with: (1) a first emission mode 127 e.g., a first correlated color temperature of 2700K or a first lumen level of 700 LM; (2) a second emission mode 128, e.g., a second correlated color temperature of 3500K or a second lumen level of 900 LM; and (3) a third emission mode 129. e.g., a third correlated color temperature of 4000K or a third lumen level of 1500 LM.

In some embodiments, the tube lamp 500 having the three aforementioned light modes, i.e., first emission mode 127, a second emission mode 128, and third emission mode 129 (having settings set depending upon being practiced in the embodiments illustrated in FIG. 10 or 11) depending upon the application to the driver 124 to the embodiments depicted in FIGS. 2 and 3 may be driven by the driver 124 including a controller 130 configured to support mode changing for the tube lamp 500 based, in part or in whole, on hysteresis. For example, mode changing of the tube lamp 500 may be based, in part or in whole, on the hysteresis phenomena of a switch 90, e.g., light switch, in operation toggling between ON and OFF electrical states. In accordance with some embodiments, the output of LEDs for the strings of LEDs 201, and thus the tube lamp 500 may be electronically controlled by controller 130. To such ends, the controller 130 may be operatively coupled with the LEDs 201 for the strings of LEDs 201 (or light source 200 more generally), for instance, by a communication bus or other suitable interconnect. In some embodiments, the controller 130 may be configured to communicate with the LEDs, i.e., solid state light emitters, via any one, or combination, of suitable standard, custom, or proprietary wired or wireless digital communications protocol.

In accordance with some embodiments, the first emission mode 127, the second emission mode 128, and the third emission mode 129 (having settings set depending upon being practiced in the embodiments illustrated in FIG. 10 or 11 of the controller 130 may be implemented in any suitable standard, custom, or proprietary programming language, such as, for example, C, C++, objective C. JavaScript, or any other suitable instruction set, as will be apparent in light of this disclosure. The module(s) of controller 130 can be encoded, for example, on a machine-readable medium that, when executed by a processor, carries out the functionality of the tube lamp 500, in part or in whole. The computer-readable medium may be, for example, a hard drive, a compact disk, a memory stick, a server, or any suitable non-transitory computer or computing device memory that includes executable instructions, or a plurality or combination of such memories. Some embodiments can be implemented, for instance, with gate-level logic, an application-specific integrated circuit (ASIC) or chip set, or other such purpose-built logic. Some embodiments can be implemented with a microcontroller having input/output capability (e.g., inputs for receiving user inputs; outputs for directing other components) and embedded routines for carrying out device functionality. In a more general sense, the functional modules of controller 130 can be implemented in any one, or combination, of hardware, software, and firmware, as desired for a given target application or end-use.

Moreover, in some embodiments, a given module of controller 130 (or controller 130 more generally) may be programmable to achieve any of the various functions and emissions capabilities desired of the tube lamp 500 for a given target application or end-use. The present disclosure is not intended to be limited only to these example lighting control modules and output signals; as additional and/or different lighting control modules and output signals may be provisioned, as desired for a given target application or end-use.

Further, it is not intended to be limited only to drivers 124 including these specific example controllers 130. In a more general sense, and in accordance with some other embodiments, controller 130 can be any power supply controller IC or microcontroller having the ability to sense the operation of the input power (e.g., based on the on/off state of switch 90, discussed below) while maintaining a hysteresis from on-to-off and off-to-on control, with LED string control being provided by controlling the on/off state of the LEDs in the first and second string of LEDs 201. In some still other cases, controller 130 may be a microcontroller programmed to receive a control input from a wired or wireless source other than, or in addition to, a switch (e.g., such as switch 90) and accordingly generate a target mode of lighting, e.g., the first emission mode 127, the second emission mode 128, and the third emission mode 129 (having settings set depending upon being practiced in the embodiments illustrated in FIG. 2 or 3), by controlling the duty cycle of the first and second string of LEDs 201.

Returning to FIG. 7, the tube lamp 500 optionally may include a communication module 126, which may be configured as a transmitter, a receiver, or both (i.e., a transceiver). In some cases, communication module 126 may be separate and distinct from controller 130 (e.g., as generally shown in FIG. 7), though in some other cases, communication module 126 may be a component of or otherwise integrated with controller 130. In accordance with some embodiments, controller 130 may be configured to output control signal(s) to the strings of LEDs 201 based, at least in part, on input received from a remote source, such as a control interface 140.

Control interface 140 may be physical, virtual, or a combination thereof and may be configured to communicate with the controller 130 (via intervening communication module 126), which in turn interprets input received from control interface 140 distributes desired control signal(s) to the strings of LEDs 201 of the light source 200. In some embodiments, the control interface 140 may be employed, in accordance with some embodiments, in changing the emissions modes of tube lamp 500. In some embodiments, the control interface 140 interacts with the switch 90, e.g., over the communications module 126, as the switch toggles from the ON and Off electrical states, and provides the signal to the driver 124. The driver 124 receiving the signal from the control interface employing the controller 130 sends a signal to illuminate selected strings of LEDs 201 to provide the first emission mode 127, the second emission mode 128, or the third emission mode 129 (having settings set depending upon being practiced in the embodiments illustrated in FIG. 10 or 11).

To such ends, the communication module 126 and control interface 140 may be configured for wired or wireless communication (or both) utilizing any one, or combination, of suitable means, such as Universal Serial Bus (USB), Ethernet, FireWire, Wi-Fi, Bluetooth, or ZigBee, among others. Optionally, the control interface 140 may be or otherwise employ a touch-sensitive display or surface, such as a touchpad or other device with a touch-based user interface (UI) or graphical UI (GUI), as provided by a computing device, mobile or otherwise. Other suitable configurations for the communication module 126 and the control interface 65 will depend on a given application.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Spatially relative terms, such as "forward", "back", "left", "right", "clockwise", "counter clockwise", "beneath," "below," "lower," "above," "upper," and the like, can be used herein for ease of description to describe one element's or feature's relationship to another element(s) or feature(s) as illustrated in the FIGs. It will be understood that the spatially relative terms are intended to encompass different orientations of the device in use or operation in addition to the orientation depicted in the FIGs.

Having described preferred embodiments of methods and structures relating to a hybrid light emitting diode tube with power select switch, it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A lamp comprising:

a light source including light emitting diodes (LEDs);

driver electronics including a filament detector portion provided by a passive resistance capacitor (RC) circuit that simulates the filament load of a fluorescent lamp when installed into a ballast containing fixture; and a power level selector switch in communication with the driver electronics for selecting the power level for powering the light source, the power level selector switch actuates a transistor within the passive resistance capacitance (RC) circuit for selecting different power levels according to select resistors connected to the transistor to control current to the light source.

2. The lamp of claim 1, wherein the power level selector switch is mounted to an exterior surface of the lamp.

3. The lamp of claim 1, wherein the light emitting diodes are surface mount device (SMD) light emitting diodes.

4. The lamp of claim 1, wherein the power level selector switch is selected from the group consisting of a slide switch, a rocker switch, toggle switch, selector switch or a combination thereof.

5. The lamp of claim 1, wherein selecting the current level includes selecting a bias setting resistor of an impendence circuit corresponding to a selected power level.

6. The lamp of claim 5, wherein the selected power level is selected from the group consisting of a first power level of 8 W, a second power level of 10 W, and a third power level of 12 W.

7. The lamp of claim 5, wherein the selected power level is selected from the group consisting of a first power level of 10 W, a second power level of 13 W, and a third power level of 16 W.

8. The lamp of claim 1, wherein the ballast containing fixture comprises a high frequency (HF) ballast, a magnetic ballast, an instant start ballast, a programed start ballast, an electronic rapid start ballast or combination thereof.

9. The lamp of claim 1, wherein when installed into the ballast free fixture, the lamp works on a direct line voltage of 120V/277V.

10. The lamp of claim 1, wherein when installed into the ballast free fixture, the lamp works on a direct line voltage of 347V.

11. The lamp of claim 1, wherein the select resistors of the filament detection portion produces a simulated load of a ballast for a fluorescent lamp.

12. The lamp of claim 1, wherein said simulated load of the ballast for the fluorescent lamp comprises increasing impedance for a start up time period.

13. The lamp of claim 1, wherein said simulated load of the ballast and said increasing impedance for the start up time period results in a start up voltage for the lamp of approximately 600 Vrms.

14. The lamp of claim 1, wherein the lamp has a tube lamp form factor.

15. A lamp comprising:

a light source including at least one string of light emitting diodes;

driver electronics including a filament detector portion provided by a passive resistance capacitor (RC) circuit to adjust load for increasing start up voltage of the light source when the lamp is fitted into a fixture during a start up time period; and a power level selector switch that actuates a transistor for selecting different select resistors, the select transistors grouped to provide different impedance values to said adjust load.

16. The lamp of claim 15, wherein the power level selector switch is mounted to an exterior surface of the lamp.

17. The lamp of claim 15, wherein the selected power level is selected from the group consisting of 8 W, 10 W, 12 W, 13 W, and 16 W.

18. The lamp of claim 15, wherein said simulated load of the ballast for the fluorescent lamp comprises increasing impedance for a start up time period.

19. The lamp of claim 15, wherein said simulated load of the ballast and said increasing impedance for the start up time period results in a start up voltage for the lamp of approximately 600 Vrms.

20. The lamp of claim 15, wherein the lamp has a tube lamp form factor.

* * * * *